(12) United States Patent  (10) Patent No.: US 7,567,248 B1
Mark et al.  (45) Date of Patent: Jul. 28, 2009

(54) SYSTEM AND METHOD FOR COMPUTING INTERSECTIONS BETWEEN RAYS AND SURFACES

(76) Inventors: William R. Mark, 1605 Pearl St., Austin, TX (US) 78701; Gregory S. Johnson, 9913 Nocturne Cove, Austin, TX (US) 78750; Chris Burns, 7201 Wood Hollow Dr. #243, Austin, TX (US) 78731

( * ) Notice: Subject to any disclaimer, the term of this patent is extended or adjusted under 35 U.S.C. 154(b) by 246 days.

(21) Appl. No.: 11/119,302

(22) Filed: Apr. 28, 2005

Related U.S. Application Data

(60) Provisional application No. 60/565,969, filed on Apr. 28, 2004.

(51) Int. Cl.
*G06T 15/00* (2006.01)
*G06T 15/50* (2006.01)
(52) U.S. Cl. ..................................... 345/426
(58) Field of Classification Search .................. 345/421, 345/427
See application file for complete search history.

(56) References Cited

U.S. PATENT DOCUMENTS

| | | | | |
|---|---|---|---|---|
| 4,943,938 A * | 7/1990 | Aoshima et al. | ............ | 345/422 |
| 5,083,287 A * | 1/1992 | Obata et al. | ................. | 345/426 |
| 5,239,624 A * | 8/1993 | Cook et al. | ................. | 345/611 |
| 5,276,532 A * | 1/1994 | Harrington | ................... | 358/444 |
| 5,377,313 A * | 12/1994 | Scheibl | ....................... | 345/422 |
| 5,583,975 A * | 12/1996 | Naka et al. | ................... | 345/426 |
| 5,742,749 A * | 4/1998 | Foran et al. | ................. | 345/426 |
| 5,808,620 A * | 9/1998 | Doi et al. | ..................... | 345/426 |
| 5,828,378 A * | 10/1998 | Shiraishi | ...................... | 345/422 |
| 6,018,350 A * | 1/2000 | Lee et al. | ..................... | 345/426 |
| 6,067,097 A * | 5/2000 | Morita et al. | ............... | 345/505 |
| 6,476,805 B1 * | 11/2002 | Shum et al. | ................. | 345/420 |
| 6,489,955 B1 * | 12/2002 | Newhall, Jr. | ................ | 345/419 |
| 6,597,359 B1 * | 7/2003 | Lathrop | ...................... | 345/440 |
| 6,639,597 B1 * | 10/2003 | Zwicker et al. | ............. | 345/427 |
| 6,677,946 B1 * | 1/2004 | Ohba | ......................... | 345/426 |

(Continued)

OTHER PUBLICATIONS

Aykanat, Cevdet; Isler, Veysi; Ozguc, Bulent; "An Efficient Parallel Spatial Subdivision Algorithm for Object-Based Parallel Ray Tracing;" 1994; First Bilkent Computer Graphics Conference; pp. 1-8.*

(Continued)

*Primary Examiner*—Kee M Tung
*Assistant Examiner*—Crystal Murdoch
(74) *Attorney, Agent, or Firm*—DLA Piper LLP (US)

(57) ABSTRACT

A system and method provide for determining in a computer system the intersections between a plurality of rays residing in three dimensional (3D) space and one or more surface elements residing in the 3D space. The rays or lines corresponding to the rays share a common intersection point. The method includes for each of the rays, storing the intersection point of the ray with a projection surface in the 3D space in a data structure in the computer system. For each of the surface elements, determining using projection a two-dimensional (2D) region representing the projection of the surface element onto the projection surface; and determining using intersection testing which points stored in the data structure are inside the 2D region. The points determined to be inside the 2D region represent intersection points between the surface element and the rays corresponding to the points.

58 Claims, 19 Drawing Sheets

U.S. PATENT DOCUMENTS

| | | | |
|---|---|---|---|
| 6,680,735 B1* | 1/2004 | Seiler et al. | 345/424 |
| 6,734,861 B1 | 5/2004 | Van Dyke et al. | |
| 6,741,247 B1* | 5/2004 | Fenney | 345/421 |
| 6,760,024 B1* | 7/2004 | Lokovic et al. | 345/421 |
| 6,798,410 B1* | 9/2004 | Redshaw et al. | 345/427 |
| 6,876,362 B1* | 4/2005 | Newhall et al. | 345/426 |
| 6,906,715 B1* | 6/2005 | Dunn | 345/421 |
| 7,023,438 B2* | 4/2006 | Lokovic et al. | 345/426 |
| 7,034,825 B2* | 4/2006 | Stowe et al. | 345/423 |
| 7,046,244 B2* | 5/2006 | Abramov et al. | 345/426 |
| 7,050,054 B2* | 5/2006 | Halmshaw | 345/424 |
| 7,126,605 B1* | 10/2006 | Munshi et al. | 345/428 |
| 7,133,041 B2* | 11/2006 | Kaufman et al. | 345/419 |
| 7,136,081 B2* | 11/2006 | Gritz et al. | 345/619 |
| 7,170,510 B2* | 1/2007 | Kawahara et al. | 345/419 |
| 2002/0050990 A1* | 5/2002 | Sowizral et al. | 345/421 |
| 2002/0171644 A1* | 11/2002 | Reshetov et al. | 345/420 |
| 2003/0011618 A1* | 1/2003 | Deering | 345/613 |
| 2003/0016218 A1* | 1/2003 | Zwicker et al. | 345/424 |
| 2003/0156112 A1* | 8/2003 | Halmshaw | 345/424 |
| 2003/0179203 A1* | 9/2003 | Bruderlin et al. | 345/473 |
| 2003/0227457 A1* | 12/2003 | Pharr et al. | 345/426 |
| 2004/0001062 A1* | 1/2004 | Pharr | 345/426 |
| 2004/0100466 A1* | 5/2004 | Deering | 345/428 |
| 2004/0104915 A1* | 6/2004 | Mori et al. | 345/561 |
| 2004/0174360 A1* | 9/2004 | Deering et al. | 345/426 |
| 2004/0174376 A1* | 9/2004 | Deering | 345/592 |
| 2004/0174378 A1* | 9/2004 | Deering | 345/611 |
| 2004/0257365 A1* | 12/2004 | Robart | 345/426 |
| 2005/0134588 A1* | 6/2005 | Aila et al. | 345/426 |
| 2005/0179686 A1* | 8/2005 | Christensen et al. | 345/423 |
| 2005/0264568 A1* | 12/2005 | Keller | 345/426 |
| 2006/0112115 A1* | 5/2006 | Chan et al. | 707/100 |
| 2006/0197780 A1* | 9/2006 | Watkins et al. | 345/620 |
| 2007/0040832 A1* | 2/2007 | Tan et al. | 345/426 |

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 701-705, 721-727, 758-764 and 792-795.*

De Floriani, Leila; "Surface Representations Based on Triangular Grids;" Feb. 1987; The Visual Computer; vol. 3, No. 1, pp. 27-50.*

Fussel, Donald; Subramanian, K. R.; "Fast Ray Tracing Using K-D Trees;" Mar. 1988; University of Texas at Austin Department of Computer Science; pp. 1-21.*

E. A. Haines and D. P. Greenberg; "The Light Buffer: A Shadow Testing Accelerator;" Sep. 1986; IEEE Computer Graphics and Applications; vol. 6, No. 9; pp. 6-16.*

Foley, James D.; van Dam, Andries; Feiner, Steven k.; Hughes, John F.; "Computer Graphics Principles and Practice;" 1996, Addison-Wesley Publishing Company; Second Edition; p. 788.*

Kilgard, Mark J.; "OpenGL Shadow Mapping with Today's OpenGL Hardware;" Game Developers Conference 2001, pp. 1-106.*

Derring, M. et al(2002) "The SAGE" Graphics Architecture, In SIGGRAPH 2002: Proceedings of the 29th Annual Conference on Computer Graphics and Interactive Techniques, ACM Press, New York, NY USA, pp. 683-692.

Johnson, G. et al., "The Irregular Z-Buffer: Hardware Acceleration for Irregular Data Structures", ACM Transactions on Graphics, (Accepted to appear Oct. 2005 or Jan. 2006, but already published in draft form in the web).

Johnson, G. et al., (Apr. 15, 2004), "The Irregular Z-Buffer and its Application to Shadow Mapping", The University of Texas at Austin, Department of Computer Sciences, Technical Report TR-04-09.

Aila, T. et al. (Jun. 21, 2004) "Alias Free Shadow Maps", Proceedings of Eurographics Symposium on Rendering 2004.

Fernando, R. et al., (2001) "Adaptive Shadow Maps", In Proceedings of the 28th Annual Conference on Computer Graphics and Interactive Techniques (ACM SIGGRAPH 2001) ACM Press, pp. 387-390.

Sen, P. et al., (2003), "Shadow Silhouette Maps", ACM Transactions on Graphics (TOG) 22:3, pp. 521-526.

Whitted, T. (1980) "An Improved Illumination Model for Shaded Display", Communications of the ACM 23 (Jun.), pp. 343-349.

* cited by examiner

SYSTEM AND METHOD FOR COMPUTING INTERSECTIONS BETWEEN RAYS AND SURFACES

CROSS-REFERENCE TO RELATED APPLICATIONS

This application claims priority from, and the benefit of, U.S. Provisional Patent Application Ser. No. 60/565,969, entitled "System and method for efficiently computing intersections between rays and surfaces", filed on Apr. 28, 2004, the contents of which are expressly incorporated herein by reference in their entirety.

TECHNICAL FIELD

The present invention relates to computer graphics, and more particularly to efficient computation of intersections between ray and surfaces in interactive three-dimensional (3D) rendering systems. These intersection tests may be used, for example, for visible surface determination and for shadow computations.

BACKGROUND OF THE INVENTION

During graphics processing, a computer is commonly used to display three-dimensional representations of an object on a two-dimensional display screen. In a typical graphics computer, an object to be rendered is divided into a plurality of graphics primitives. The graphics primitives are basic components of a graphics picture and may be defined by geometry such as a point, line, vector, or polygon, such as a triangle.

To produce an image for the two-dimensional display screen, the following two steps are typically performed, as well as others not described in detail here.

Eye-view visibility: For each pixel on the two-dimensional display screen, the computer determines which primitive is visible (i.e. front-most) at that pixel. The computer also determines the exact point on that primitive that is visible at the pixel.

Light visibility (shadow computation): For each surface point that was determined to be visible by the first step, the computer determines whether the surface point is visible from the light source, indicating whether or not the surface point is in shadow. If there is more than one light source, this step is repeated for each light source.

These two tasks and others can be considered to be specific cases of the problem of determining which surfaces are visible (i.e. intersected first) along a specific a set of rays.

The prior art consists of a wide variety of approaches for performing visibility tests, including:

Ray tracing: Turner Whitted, An Improved Illumination Model for Shaded Display, Communications of the ACM, vol. 23, no. 6, June 1980, pp. 343-349.

Classical Z-buffer: Ed Catmull, A Subdivision Algorithm for Computer Display of Curved Surfaces, Ph.D. Dissertation, University of Utah, 1974.

Shadow mapping (classical Z-buffer used for light viewpoint): Lance Williams, Casting Curved Shadows on Curved Surfaces, Computer Graphics (SIGGRAPH 1978), vol. 12, no. 3, August 1978, pp. 270-274.

Shadow volumes: Franklin Crow, Shadow Algorithms for Computer Graphics, Computer Graphics (SIGGRAPH 1977), vol. 11, no. 2, July 1977.

-And-

Morgan McGuire and John F. Hughes and Kevin Egan and Mark Kilgard and Cass Everitt. Fast, Practical, and Robust Shadows. Brown University Technical Report CS03-19, October 2003.

All publications, patent applications, patents, and other references mentioned herein are incorporated by reference in their entirety.

The ray tracing approach is highly general, but it is computationally expensive. The ray tracing approach has the additional disadvantage that the rendering system maintains a large spatially sorted data structure containing the graphics primitives. For these reasons, the ray tracing approach has not been widely used by interactive rendering systems.

The conventional Z-buffer approach is the approach most commonly used in real-time rendering systems. However, it can only evaluate a restricted set of visibility queries: those in which all rays share a common origin and whose directions are regularly spaced. This restriction is equivalent to stating that an image generated using this technique must have its sample points located in a regular pattern such as a grid, as shown in FIG. 1. When the Z-buffer visibility approach is used for the purpose of computing shadows (i.e. shadow mapping), it produces visually objectionable errors such as those shown in FIG. 3.

The shadow volume technique was developed to avoid the objectionable errors of shadow mapping. Although the shadow volume technique has been used occasionally in commercial systems, it is widely considered to require excessive computational resources and to be particularly difficult to integrate into a complete and flexible image generation system.

Therefore, a need exists for a method and apparatus for computing visibility that is more efficient than ray tracing and shadow volumes; that produces fewer visual errors than shadow mapping; that is simpler to integrate into a complete system than shadow volumes; and that supports a more flexible set of visibility queries than the conventional Z-buffer. More specifically, a need exists for a method and apparatus for computing visibility that runs at real-time frame rates and whose programming interface is similar to that of the conventional Z-buffer, but that allows visibility to be computed for an irregularly arranged set of points on the image plane as shown in FIG. 2.

SUMMARY OF THE INVENTION

The present invention provides a system and method for determining in a computer system the intersections between a plurality of rays residing in three dimensional (3D) space and one or more surface elements residing in the 3D space. The rays or lines corresponding to the rays share a common intersection point. The method includes for each of the rays, storing the intersection point of the ray with a projection surface in the 3D space in a data structure in the computer system. For each of the surface elements, determining using projection a two-dimensional (2D) region representing the projection of the surface element onto the projection surface; and determining using intersection testing which points stored in the data structure are inside the 2D region. The points determined to be inside the 2D region represent intersection points between the surface element and the rays corresponding to the points.

DETAILED DESCRIPTION

The present invention may provide a new method and system for computing intersections between rays and surfaces. In one embodiment, computations of intersections between rays and surfaces are used for computing shadows in an interactive rendering system.

The following description consists of four major parts:
a) Computer System: A high level description of a computer system that determines the intersection of rays and surfaces.
b) Shadow Computation: A high-level description of how the present invention can be used to produce images containing shadows.
c) Ray/Surface Intersection: A high-level description of a method for computing intersections between rays and surfaces, and of the data structures used for this purpose in one embodiment.
d) Graphics Processor: A detailed description of an embodiment that uses a specific graphics processor architecture that allows the entire system to run at real-time frame rates.

Computer System and Graphics Processing Unit

Figure 10:
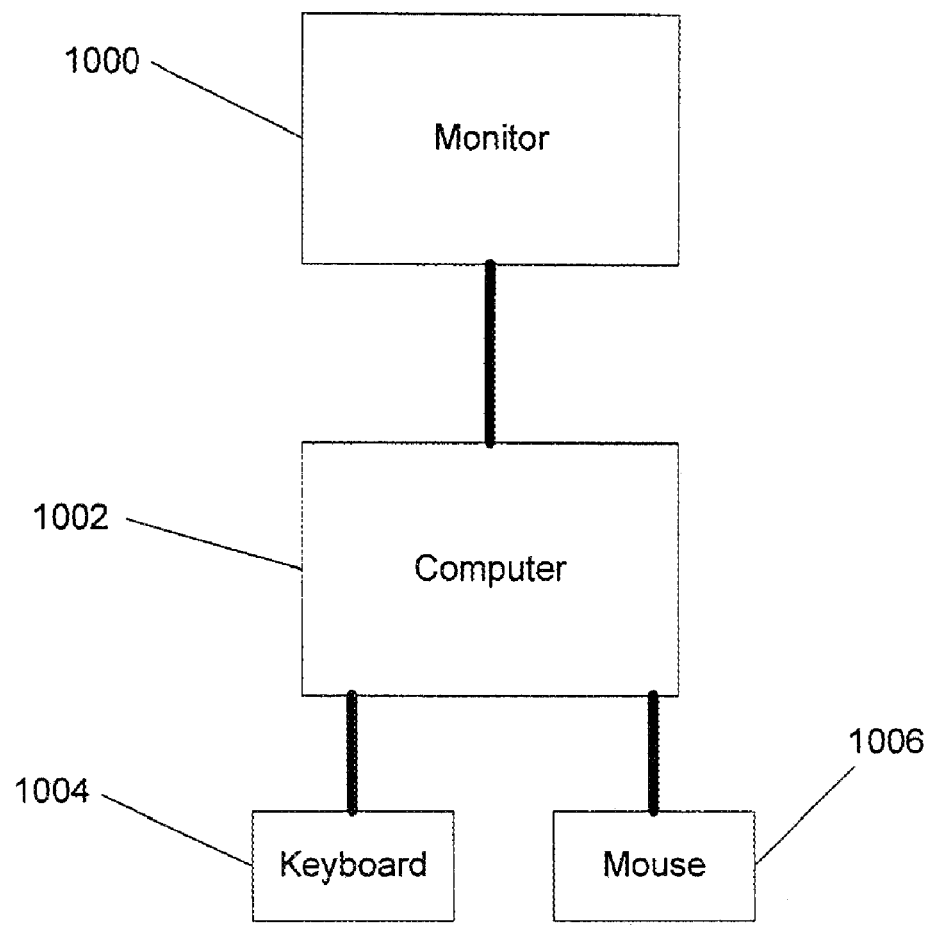
FIG. 10 is a block diagram illustrating a computer system.

FIG. 10 shows a computer system that includes a monitor 1000, a computer 1002, a keyboard 1004, and a mouse 1006.

Figure 11:
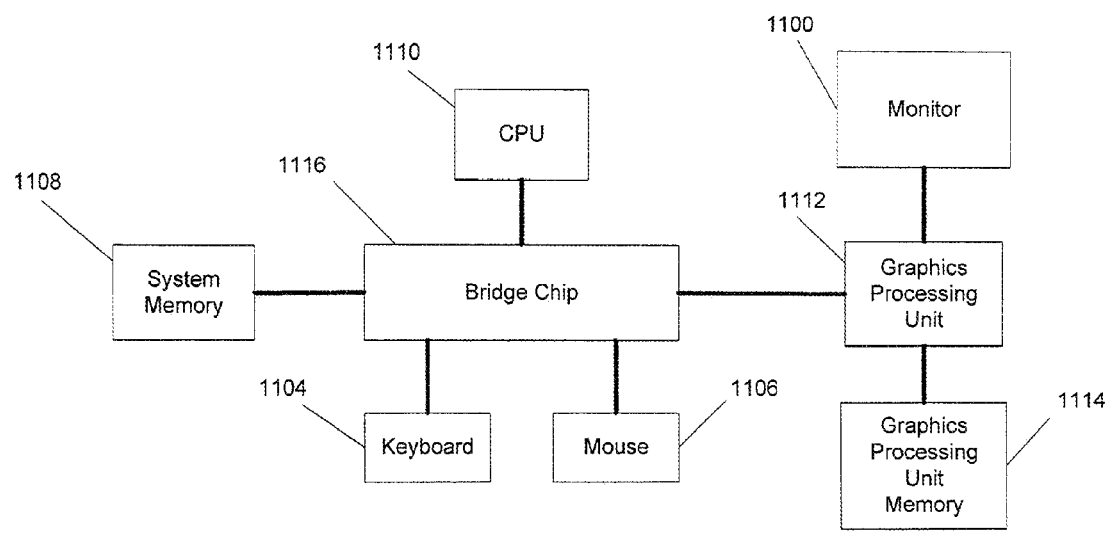
FIG. 11 is a block diagram illustrating a computer of the computer system of FIG. 10.

FIG. 11 shows more details of the computer system of FIG. 10, and in particular shows how a Graphics Processing Unit 1112 and a central processing unit (CPU) 1110 are coupled by a bridge chip 1116 to other parts (e.g., a monitor 1100, a keyboard 1104, a mouse 1106, and a system memory 1108) of the system. The Graphics Processing Unit 1112 includes an attached Graphics Processing Unit Memory 1114.

Figure 12:
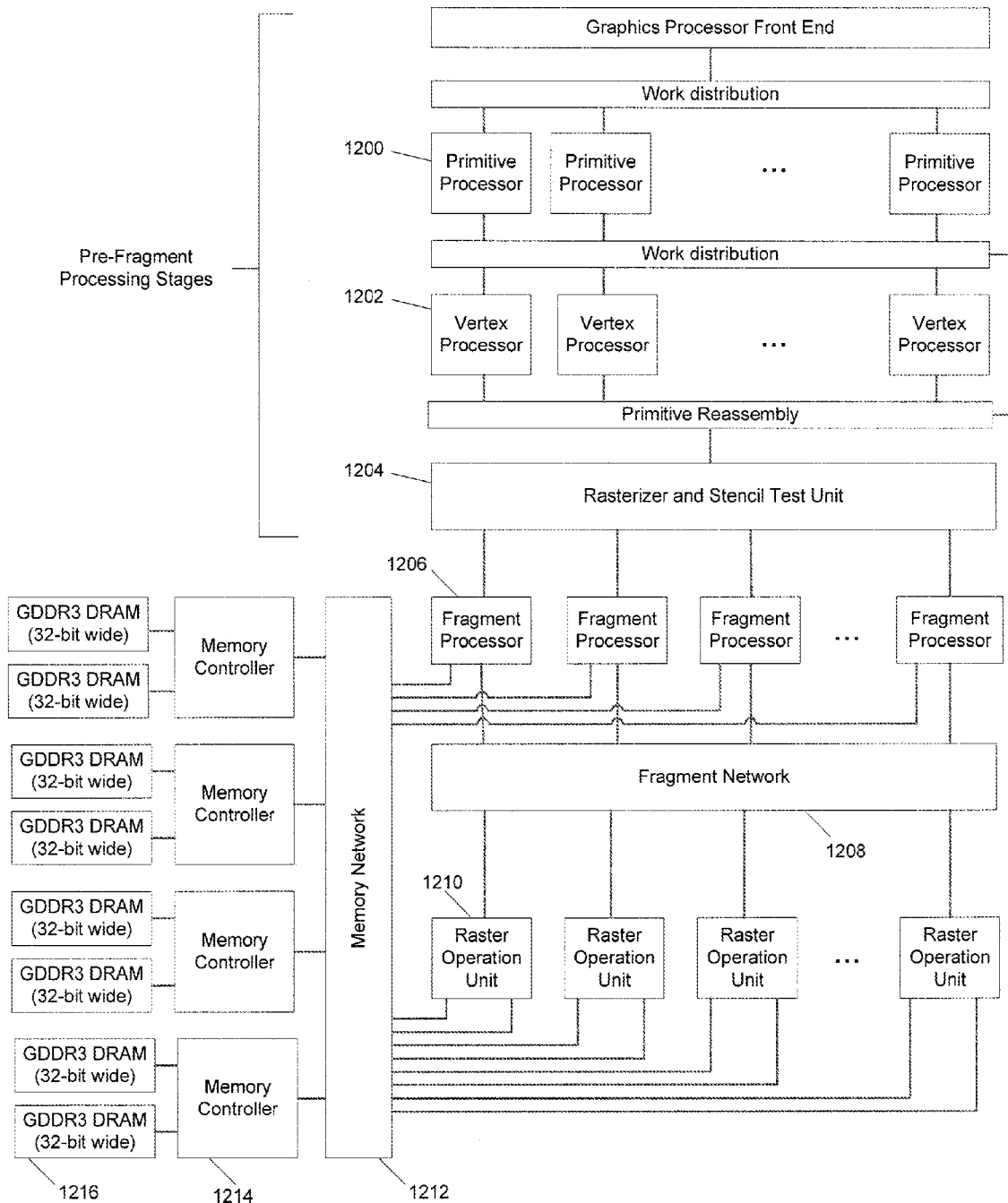
FIG. 12 is a block diagram illustrating a graphics processing unit of the computer of FIG. 11.
Figure 13:
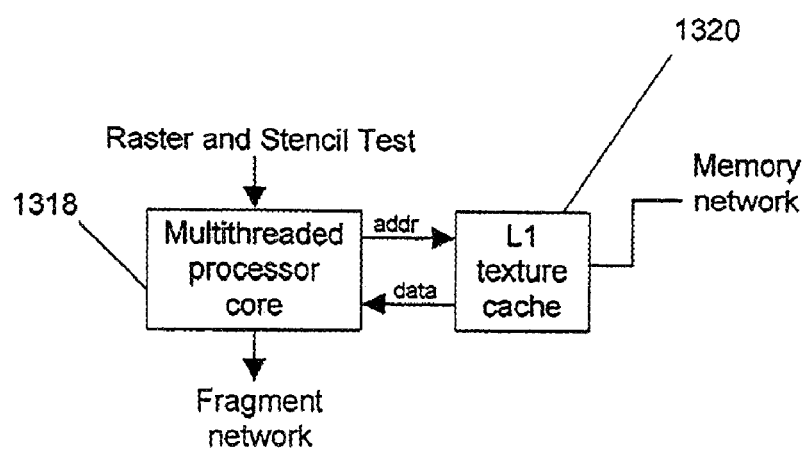
FIG. 13 is a block diagram illustrating a fragment processor of the graphics processing unit of FIG. 12.
Figure 14:
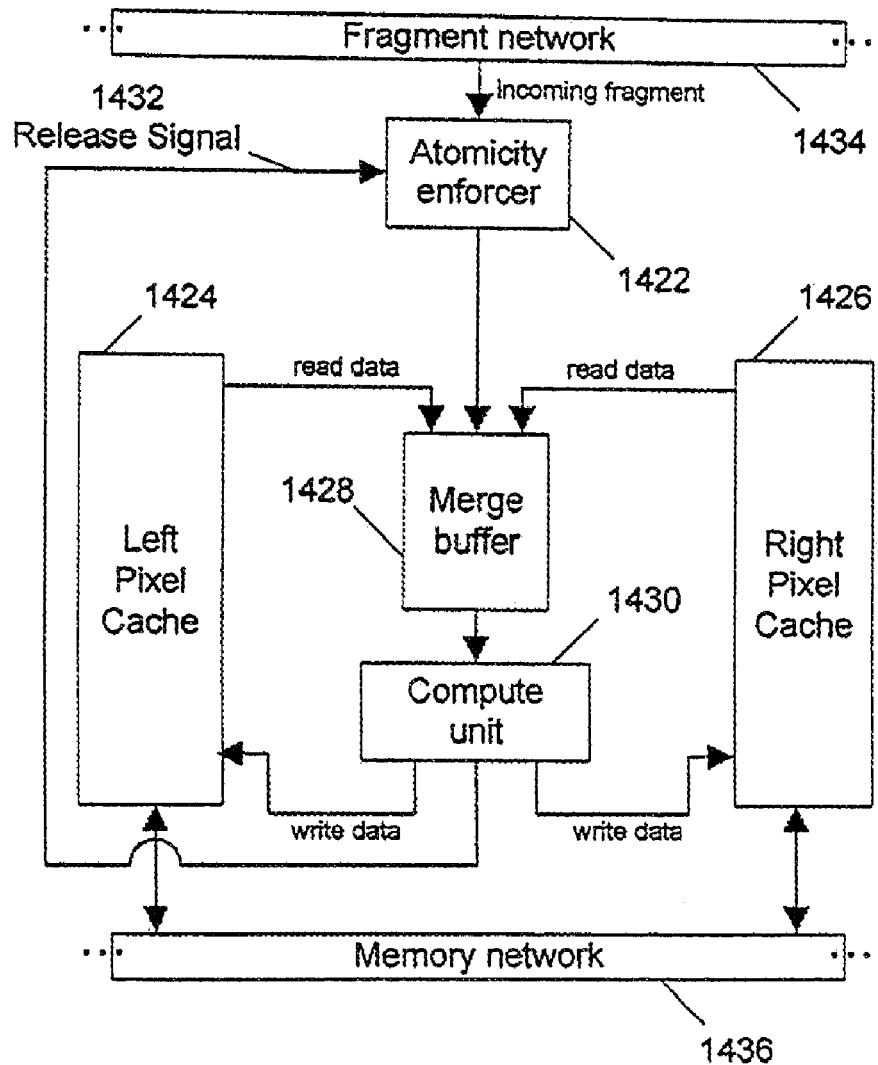
FIG. 14 is a block diagram illustrating a raster operation unit of the graphics processing unit of FIG. 12.

FIG. 12 shows the internal architecture of the Graphics Processing Unit 1112, which supports the standard capabilities of prior-art graphics processors, such as the NVIDIA GeForce 6800 or ATI X800, and further supports the technique of irregular rasterization in accordance with the present invention. FIG. 13 shows additional details of a Fragment Processor 1206 of the Graphics Processing Unit 1112. FIG. 14 shows additional details of Raster Operation Unit 1210. This Raster Operation Unit is a specialized read/modify/write unit. FIGS. 12, 13 and 14 are described in further detail below.

Shadow Computation

Figure 4:
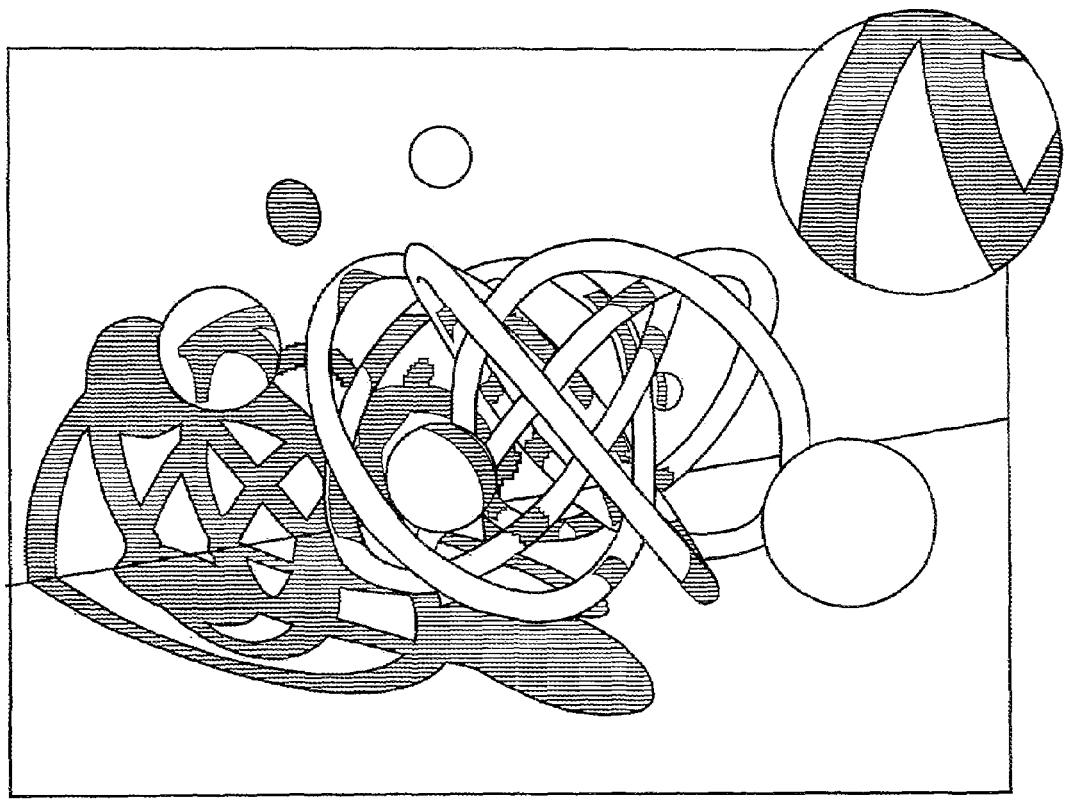
FIG. 4 is a diagram illustrating an image generated by the computer system of FIG. 10.

The present invention computes shadows using an improvement on the conventional shadow-mapping approach. In one embodiment, the shadow-map samples are taken at the desired points on the shadow-map image plane rather than at points on a pre-defined regular grid as the prior-art shadow mapping technique does. By taking samples at the desired points, this embodiment eliminates the aliasing artifacts produced by prior-art shadow mapping techniques. FIG. 4 shows an image produced by this embodiment.

Figure 6:
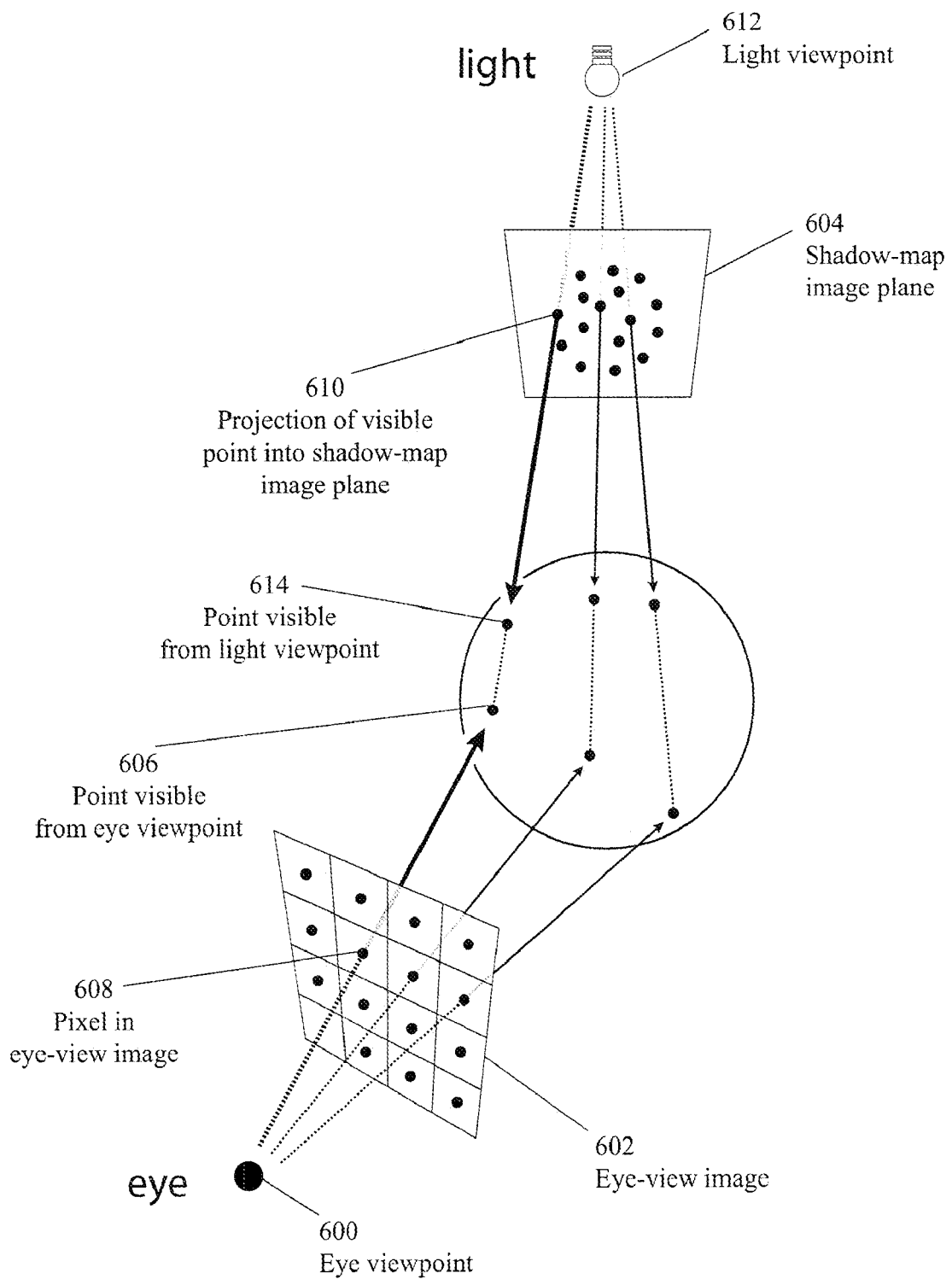
FIG. 6 is another diagram illustrating geometry of projections in accordance to the present invention.

FIG. 6 shows the geometric configuration represented mathematically within the system while computing an image with hard shadows.

For eye-view visibility, all of the rays share a single origin, the eye viewpoint 600. For light-view visibility, all of the rays share a single origin, as long as the light is treated as a point light source as it is in FIG. 6. Light viewpoint 612 is the origin shared by all of the rays used for light-view visibility in FIG. 6.

Figure 1:
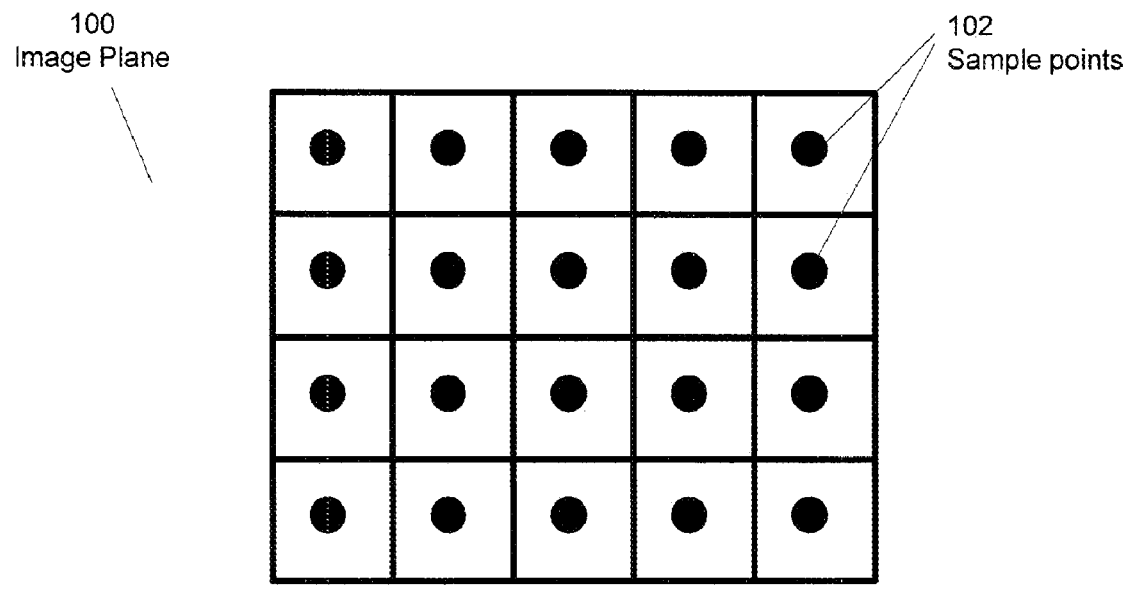
FIG. 1 is a diagram illustrating sample points in an image plane in a conventional system.
Figure 2:
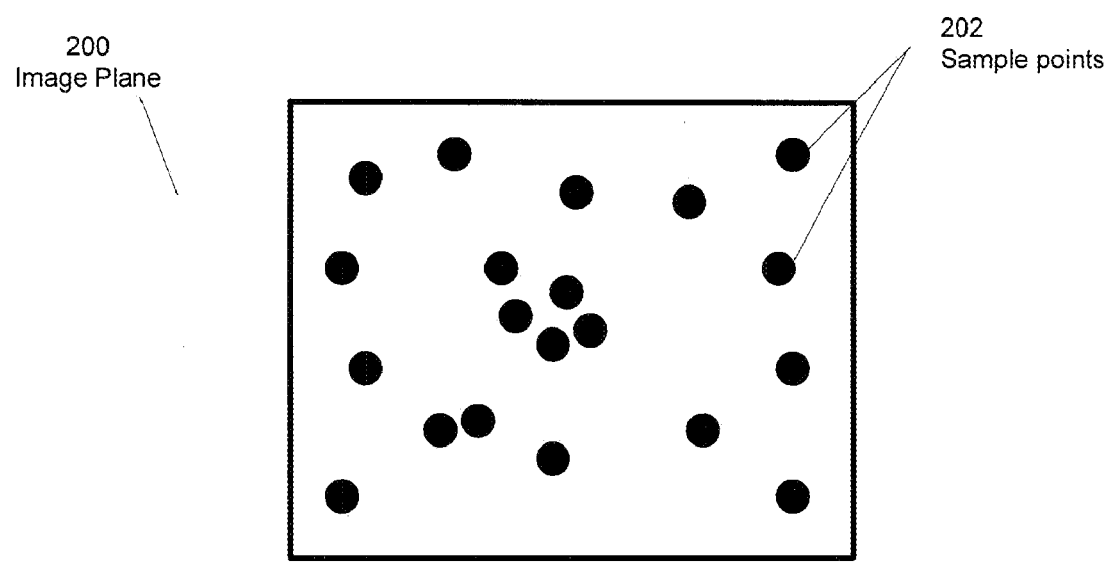
FIG. 2 is a diagram illustrating sample points in an image plane according to the present invention.
Figure 3:
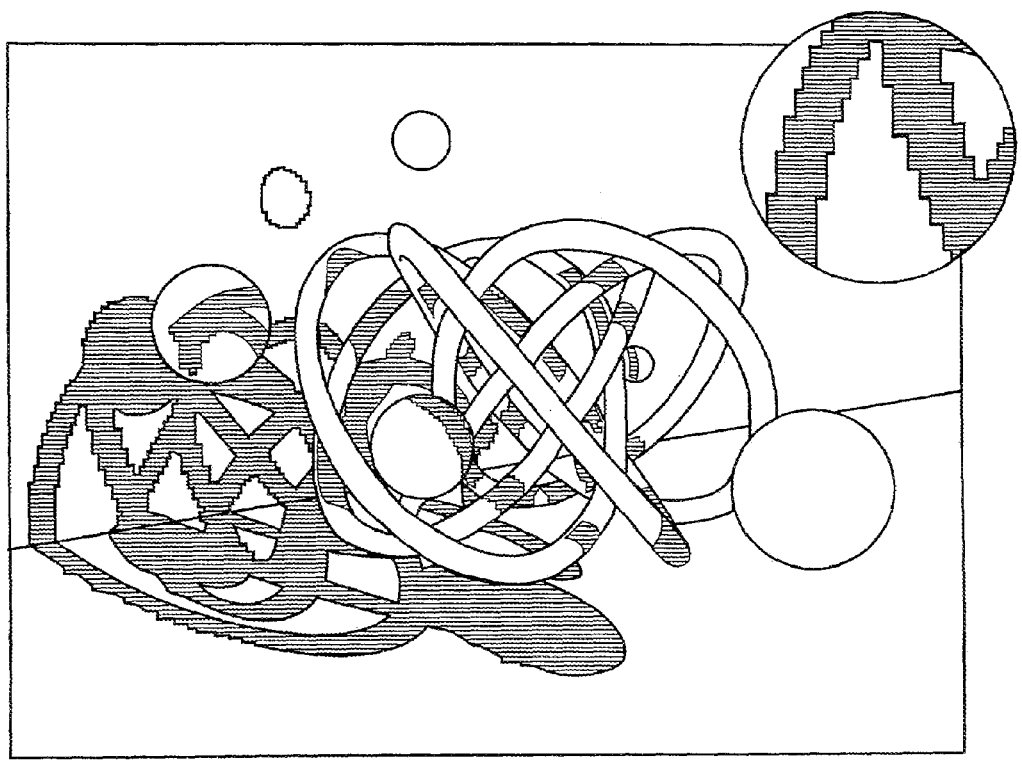
FIG. 3 is a diagram illustrating an image generated by a conventional computer system.

In the case where all visibility-test rays share a common origin, this origin is typically used to define the center of projection of an image plane. With this definition, the ray directions may be interpreted as sample points on the image plane. FIG. 1 illustrates the regular array of sample points that is used by prior art for determining which surfaces are visible from the eye viewpoint. FIG. 2 illustrates the irregular array of sample points that would be superior for determining which surfaces are visible from a light viewpoint.

The overall shadow computation procedure works as follows:

First, an image is generated from the Eye Viewpoint 600 to determine the set of 3D points 606 for which shadow information is needed. This image is generated using the conventional Z-buffer rendering algorithm, which uses Sample Points 608 located on a regular grid in the Eye-view Image Plane 602. The result of this step is a 2D array of depth values (900 in FIG. 9). Each depth value is associated with a single Sample Point 608. For each Sample Point 608, this depth value specifies the distance to the first visible surface at that sample point, shown in FIG. 6 as Point Visible from Eye Viewpoint 606. Thus the 2D array 900 specifies the locations 606 of the Points Visible from Eye Viewpoint 606.

Second, the points 606 are projected onto the shadow-map image plane 604 using light viewpoint 612 as the center of projection. The purpose of this step is to determine the 2D location on the shadow-map image plane 604 of each sample that is desired. These sample locations 610 are stored in a 2D data structure that allows efficient range queries, as described in the next subsection. In one embodiment, this data structure is stored in memory as Physical Grid 700 and Node Array 710 (see FIG. 7), both of which are 2D arrays.

Third, the ray/surface intersection technique described in the next subsection is used to produce a shadow-map image with depth samples at exactly the desired locations in the shadow-map image plane. At the end of this step, the system holds a depth value for each sample point 610 on the shadow-map image plane 604. Each depth value represents the location 614 of a point visible from the light viewpoint along the ray originating at light viewpoint 612 and passing through a sample point 610. In one embodiment, these depth values are stored in Light-View Depth Array 906, which is indexed just like an ordinary eye-view image.

Finally, a regular Z-buffer image is rendered from the eye view, and shading is performed by using the previously-computed light-view depth values (stored in 906) to indicate whether or not each visible point is in shadow. A point 606 is in shadow if the distance from the light viewpoint 612 to the point visible from light viewpoint 614 is less than the distance from the light viewpoint 612 to the point visible from eye viewpoint 606. Otherwise, the point 606 is not in shadow.

Figure 15:
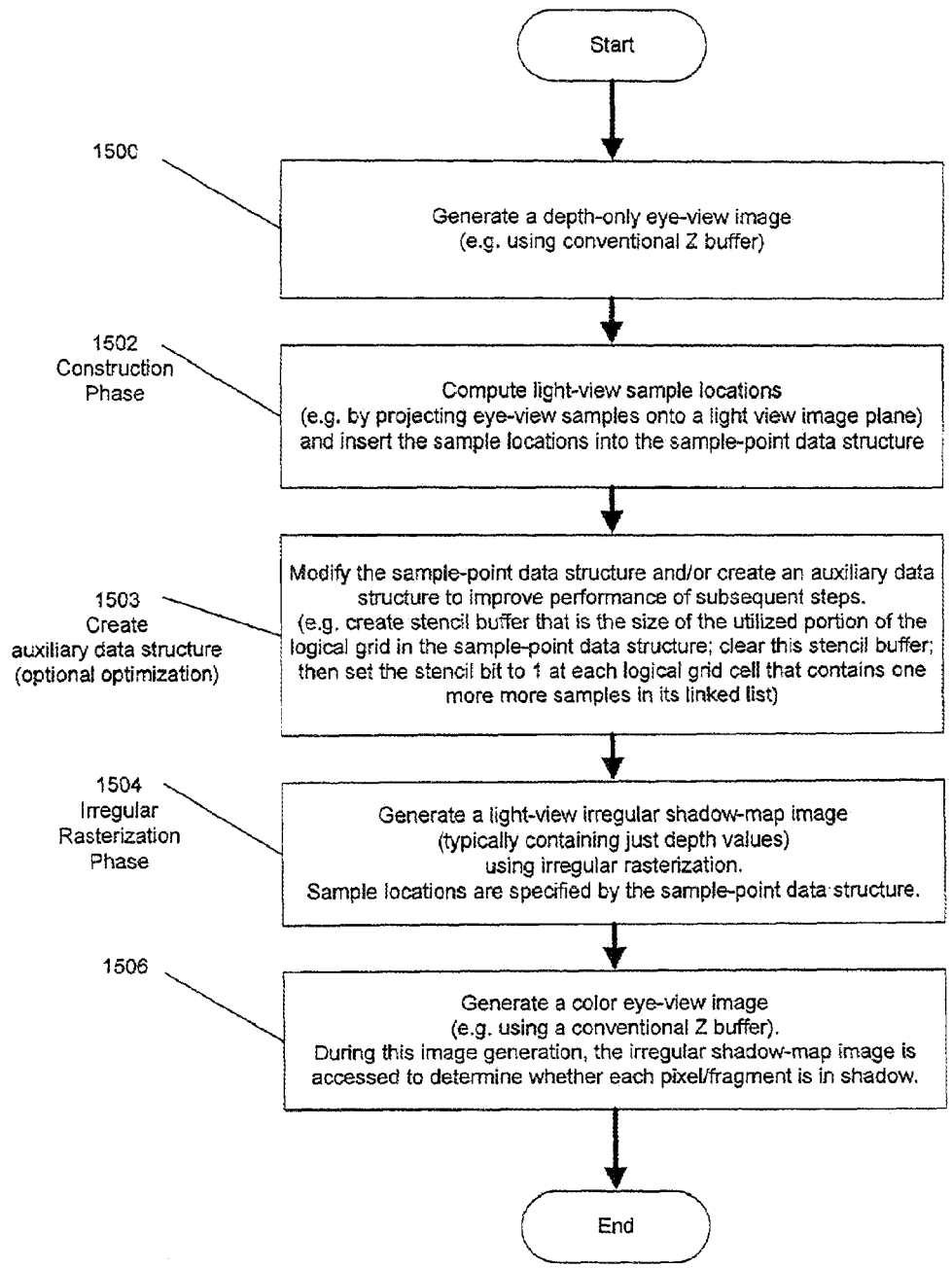
FIG. 15 is a flowchart illustrating the operation of shadow computations of the computer system of FIG. 10.

FIG. 15 is a flow chart illustrating a high-level sequence of steps to produce an image that includes shadows cast by a single light source. The overall control of this series of steps is provided by software running on CPU 1110. However, the majority of computation for steps 1500, 1502, 1503, 1504 and 1505 occurs in the Graphics Processing Unit 1112. This mode of operation in which the CPU 1110 orchestrates a series of computations that are primarily performed by the graphics processing unit is well known to those skilled in the art, and is often referred to as multi-pass rendering. FIG. 15 is described in more detail below.

Ray/Surface Intersection

Figure 5:
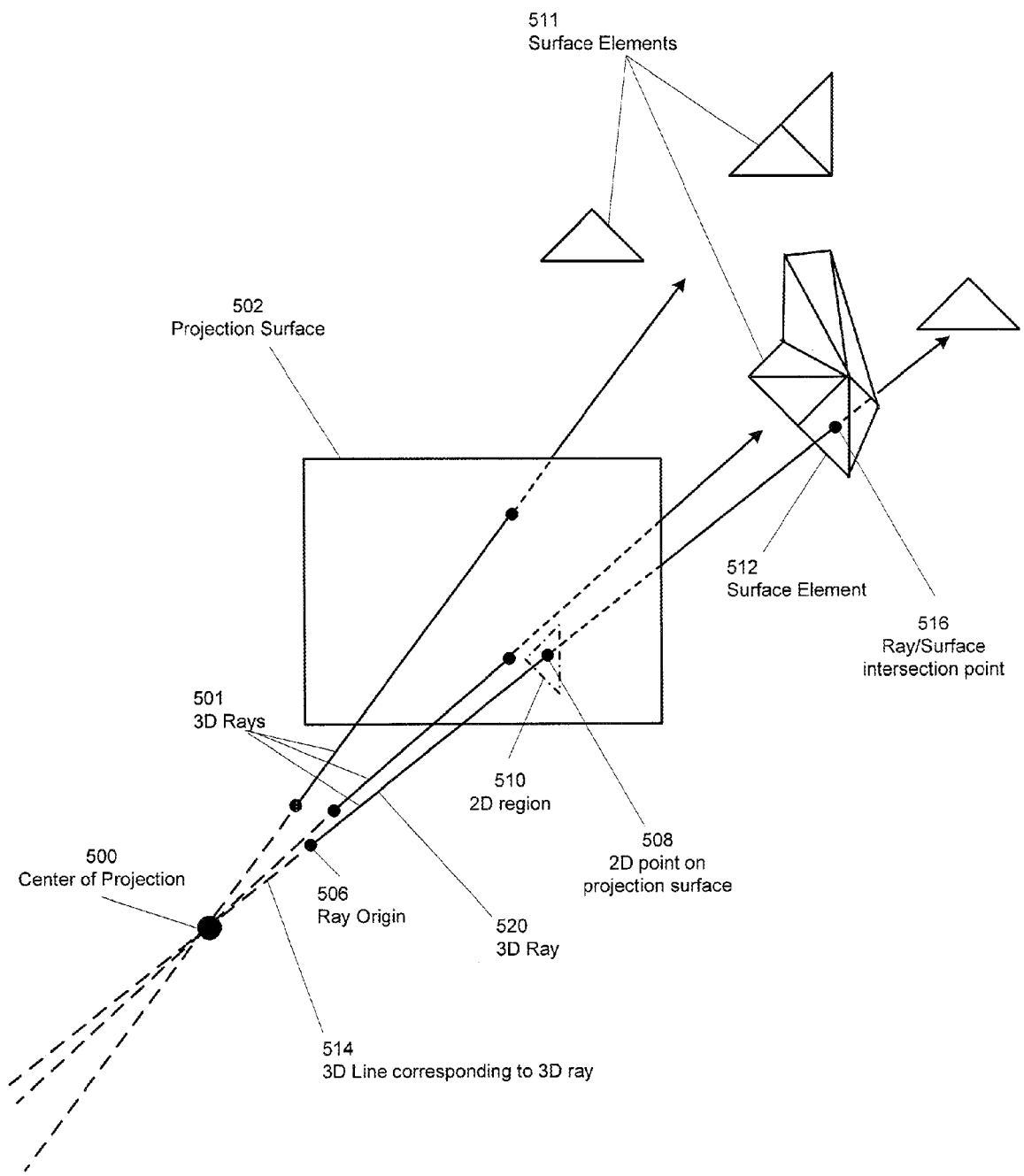
FIG. 5 is a diagram illustrating geometry of projections in accordance to the present invention.

The present invention uses a new method and system of computing intersections between rays and surfaces. FIG. 5 shows a typical geometrical configuration to which the invention may be applied. The goal is to compute the intersection points between 3D Rays 501 and Surface Elements 511. More specifically, for each 3D Ray 501, the goal is to determine the intersection point between 3D Ray 501 and Surface Elements 511 that is closest to Ray Origin 506. As shown in FIG. 5, this first intersection point for Ray 520 is with Surface Element 512 at Ray/Surface intersection point 516.

Although this problem is conceptually simple, solving this problem is computationally expensive when the number of Rays 501 and Surface Elements 511 is large. In interactive computer graphics systems, it is common to have one million rays and several million surface elements. The complete set of intersections may be found 30 or more times each second.

Therefore it is common to place specific constraints on the permissible rays to facilitate efficient solutions to the problem. The constraints are most easily expressed in terms of restrictions on the lines that are formed by extending each ray to infinity in both directions. In FIG. 5, line 514 (Line corresponding to 3D ray) represents the extension of Ray 520 to infinity in both directions. In the conventional Z-buffer as well as in one embodiment of the present invention, all of the Lines 514 corresponding to 3D rays 501 intersect at a single point, called the Center of Projection 500.

To further facilitate an efficient solution to the problem, it is common to express the ray directions as 2D points 508 on a projection surface 502. The location of each 2D point 508 may be found by computing the intersection of the corresponding Ray 520 with Projection Surface 502. More precisely, the system computes the intersection of Line 514 with Projection Surface 502. In one embodiment, the Projection Surface 502 is a plane, but other projection surfaces such as cylinders or cubes may be used.

In the conventional Z-buffer, the ray directions are restricted such that the 2D points 508 lie in a regular pattern on Projection Surface 502. The computer system of FIG. 10 advantageously removes this restriction completely. When using this computer system to compute ray/surface intersections, the 2D points 508 may lie at arbitrary locations on the Projection Surface 502, and thus the Rays 501 may have arbitrary directions, as long as the rays intersect Projection Surface 502.

Given this set of restrictions of the conventional Z-buffer, the computer system of FIG. 10 may reduce the problem of computing intersections between rays and surface elements from a three dimensional problem to a two dimensional problem. Conceptually, each Surface Element 511 is projected onto Projection Surface 502, yielding a 2D region 510 on the projection surface. If a 2D point 508 lies within 2D region 510, then there is an intersection between the Surface Element 512 and the 3D Line 514. If the Ray Origin 506 does not lie on Center of Projection 500 then a depth comparison is used to determine if the intersection point between the line and the surface element lies on the Ray 520.

The method just described finds all intersections between Rays 501 and Surface Elements 511. However, there may be more than one such intersection point for each Ray 501. Often, the goal is to find the closest such intersection point to Center of Projection 500, since the closest intersection point is the one that is "visible" from the Center of Projection 500. As in the conventional Z-buffer, the system of FIG. 10 performs intersection tests with one Surface Element 511 at a time. In a storage location associated with each 2D point 508, the system stores the distance (more precisely depth-reciprocal) to the closest intersection point found so far. If a new intersection point between the ray and a surface element is found, and this new intersection point is closer than the old one, the stored depth value is updated. If desired, additional information about the surface such as color may be updated as well. Thus, when the processing of all Surface Elements 511 is complete, the stored depth value indicates the closest intersection point that was found.

A major difference between the system of FIG. 10 and the conventional Z-buffer is that the system stores the 2D location of all points 508 in a 2D spatial data structure 708, rather than representing the 2D locations implicitly with a computed pattern. In one embodiment, a grid of lists is used for the 2D spatial data structure 708, but alternative embodiments may use any data structure that admits efficient 2D range queries. The grid of lists data structure comprises a top-level grid, with each grid element serving as the root of a linked list containing all of the sample locations located in the grid element.

The operation of the system of FIG. 10 includes two major steps:

A preprocessing step in which the system creates the 2D spatial data structure 708 containing the locations of the points 508.

The actual intersection testing step.

In the intersection testing step, the Surface Elements 511 are processed one at a time (more precisely, a small number in parallel). For each surface element, the following sub-steps are performed: The Surface Element 512 is projected onto the image plane, yielding a 2D region 510. The system then finds all points within 2D spatial data structure 708 that fall within the 2D region 510. This process will be referred to as a 2D range query.

In one embodiment, the 2D range query is implemented by first determining which Physical Grid Cells 706 are overlapped by the 2D region 510. Then, the 2D point locations stored at the linked list associated with each such grid cell are examined one at a time, and each point location is tested to determine if it lies within the 2D region 510. This brief description simplifies and omits some details that are described in more depth in the next subsection.

Figures Showing how Ray/Surface Intersection Testing Works at a High Level

FIG. 1 shows that the sample points 102 for a conventional Z-buffer are located at regular intervals on the image plane 100. Although some conventional Z-buffer systems use more complex patterns than shown in FIG. 1, the locations are always chosen algorithmically, or by a combination of an algorithm and a small on-chip table as in the prior-art SAGE system. (Nagle and Deering, The SAGE Graphics Architecture, SIGGRAPH 2002).

FIG. 2 shows that for our invention the sample points 202 may be located at arbitrary points on the image plane 200. Because these sample locations cannot be computed algorithmically, they are explicitly stored.

Figure 7:
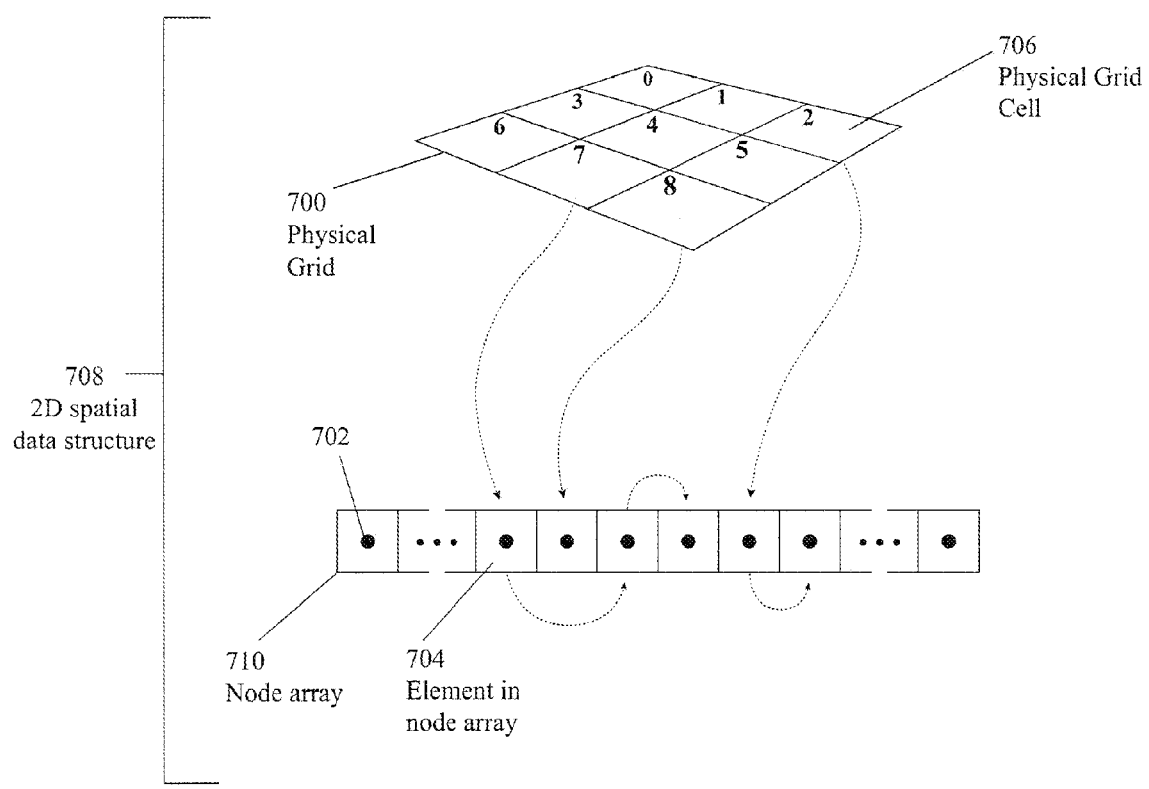
FIG. 7 is a diagram illustrating a data structure in accordance to the present invention.

FIG. 7 illustrates the data structure used by one embodiment to store the Sample-Point Locations 202. The Sample-Point Locations 202 are stored in a Physical Grid 700, with each Physical Grid Node 706 serving as the root of a Linked List 704 of nodes, with each node containing one of the Sample-Point Locations 202.

Figure 8:
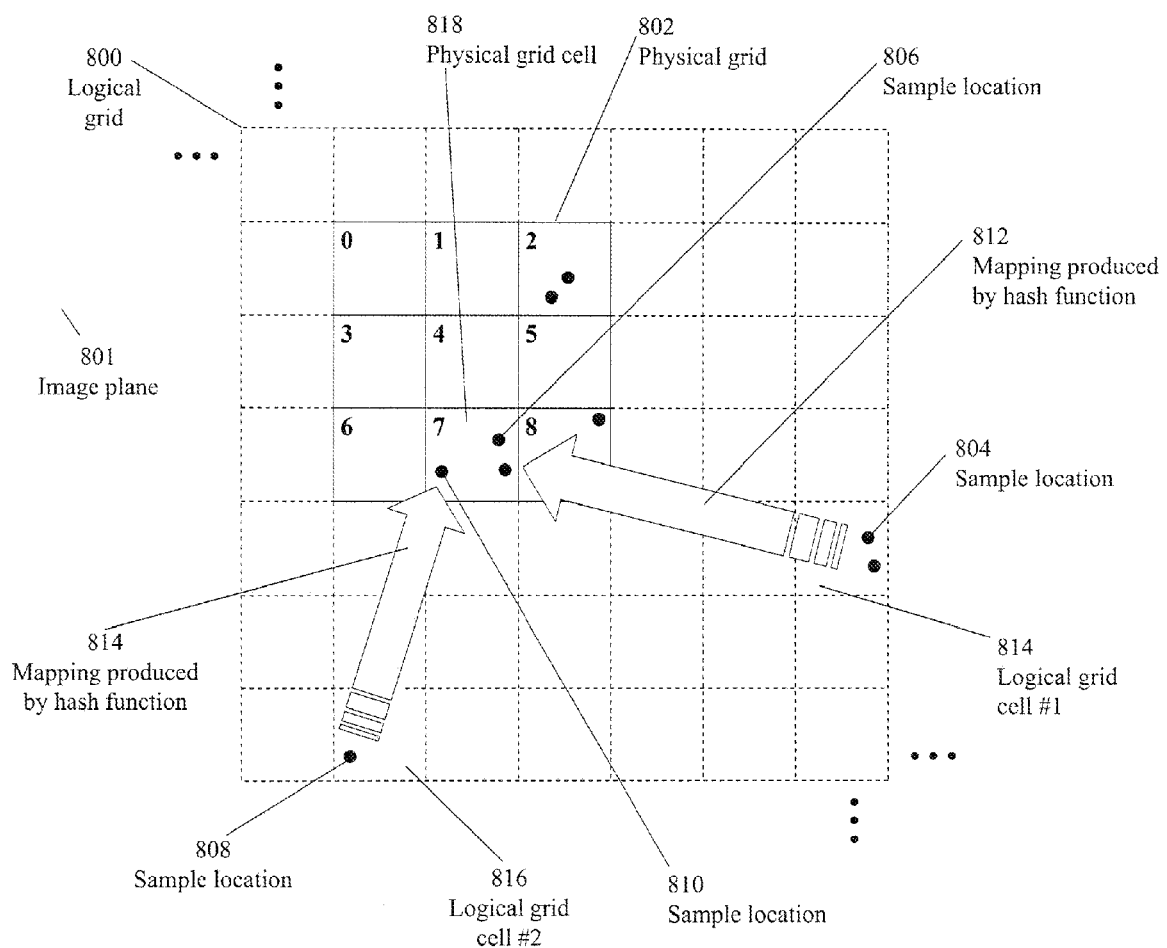
FIG. 8 is an illustration of the mapping from logical grid cell to physical grid cell of FIG. 7 produced by as hash function.

FIG. 8 shows how the system selects a Physical Grid Node in which to store a particular Sample-Point Location. First, the Sample-Point Locations are considered to represent two-dimensional coordinates on an unbounded image plane 801. Next, the system truncates the continuous image plane coordinates to form integral coordinates within Logical Grid 800. There is no apriori size for Logical Grid 800—its extent is unbounded. Finally, a hash function is used to map these unbounded logical grid coordinates into bounded physical-grid coordinates within Physical Grid 802. A sample location 804 in logical grid cell #1 814 may be mapped by mapping 812 to sample location 806 in physical grid cell 818. A sample location 808 in logical grid cell #2 816 may be mapped by mapping 814 to sample location 810 in physical grid cell 818.

Figures Showing how Ray/Surface Intersection Testing Works in Detail

Figure 9:
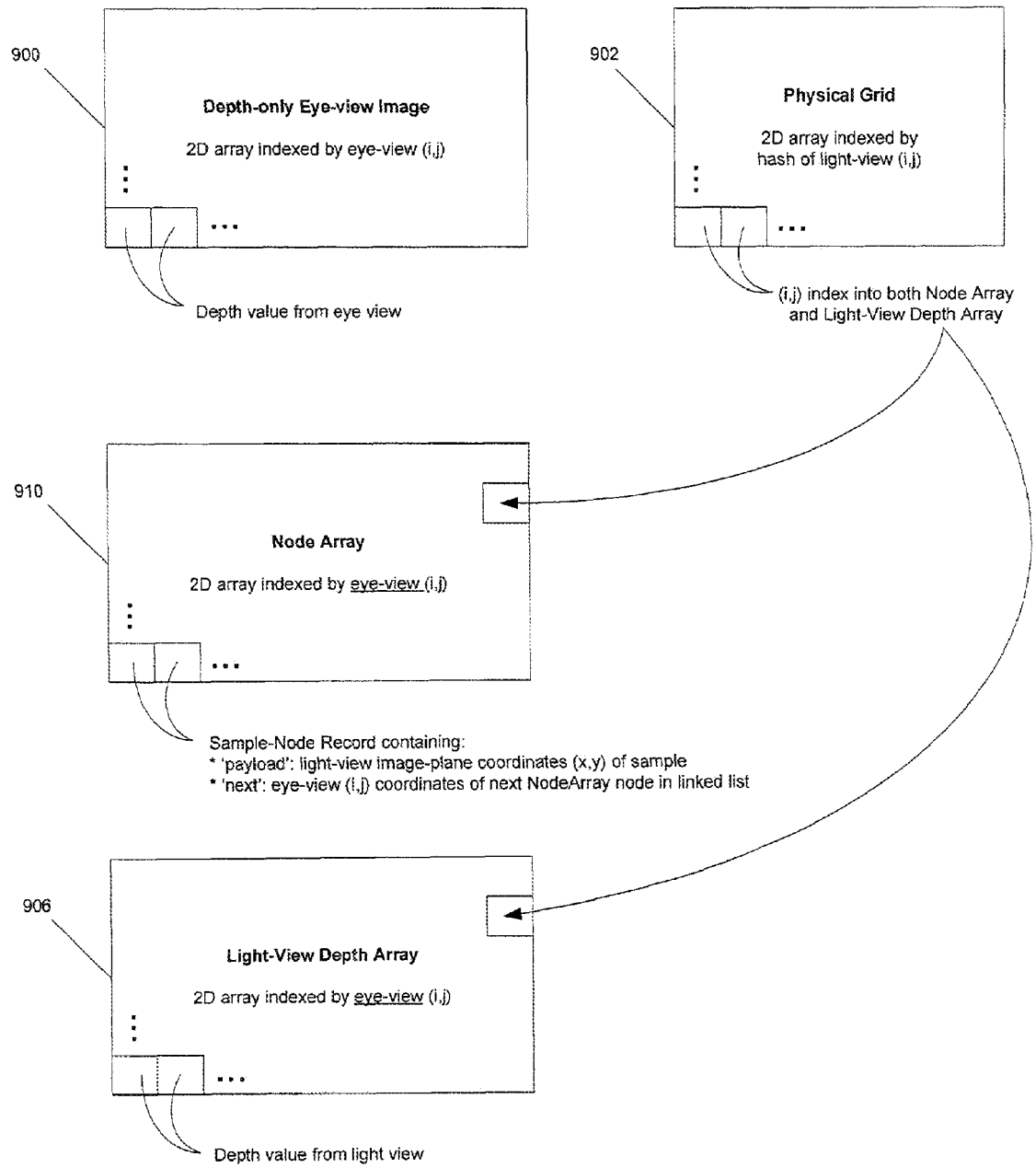
FIG. 9 is a diagram illustrating data structures in accordance to the present invention.

FIG. 9 shows the data structures used by the system for the entire process of shadow computation and ray/surface intersection testing. These data structures are stored in the memory of Graphics Processing Unit 1112.

Figure 16:
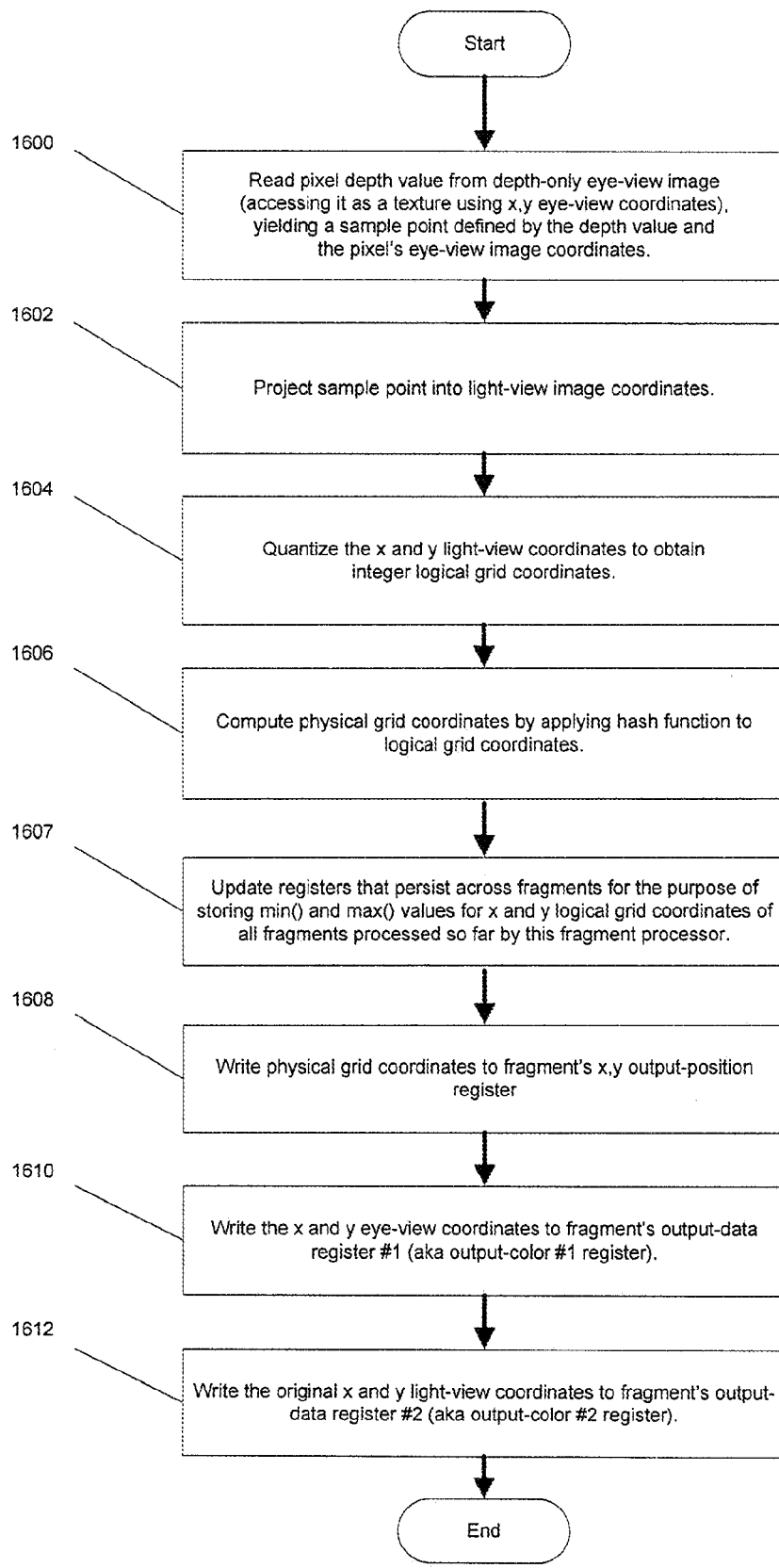
FIG. 16 is a flow chart illustrating the operation of the fragment processor during a construction phase of irregular shadow mapping
Figure 17:
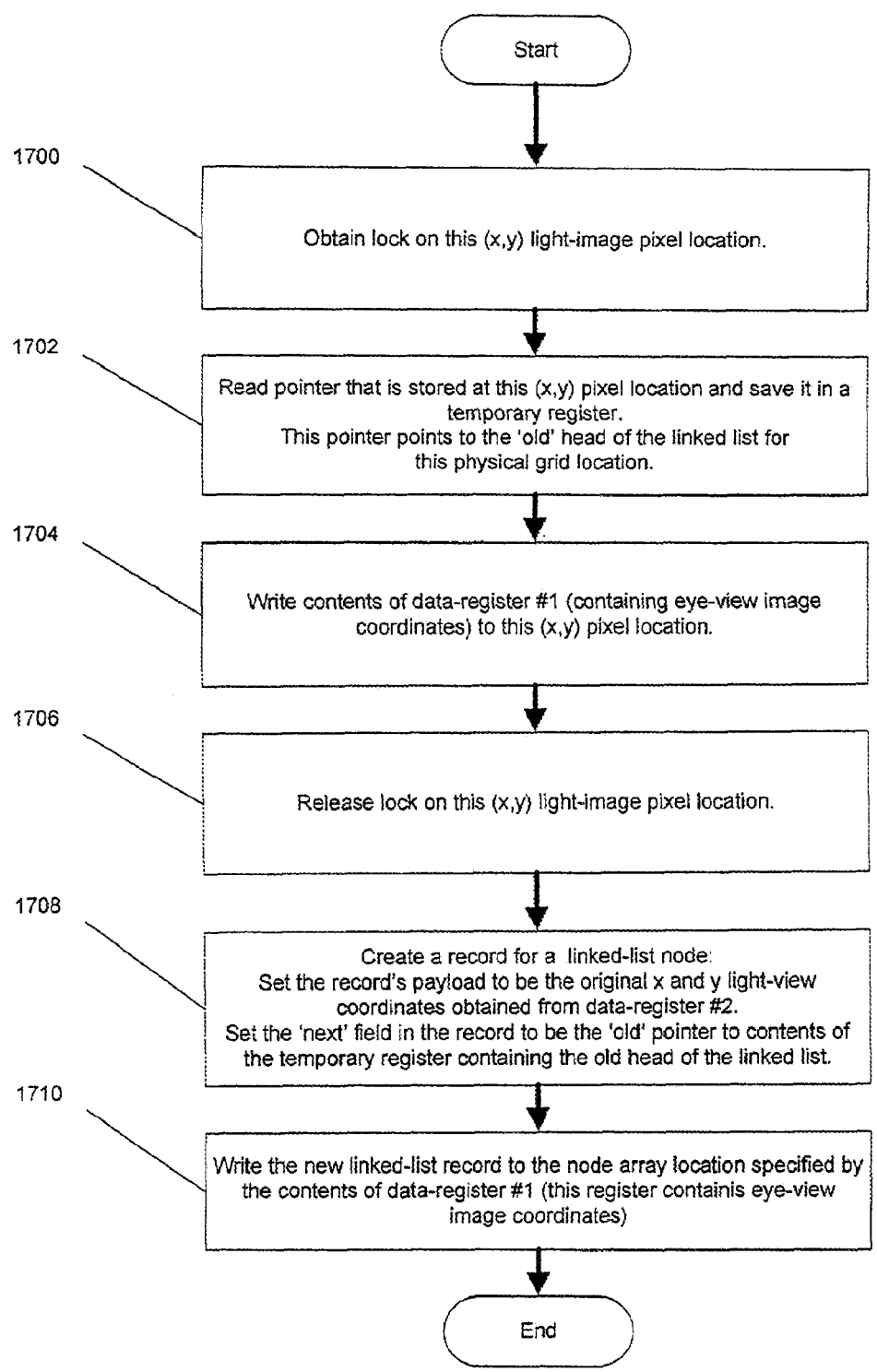
FIG. 17 is a flow chart illustrating operations of the raster operation unit during the construction phase.

FIGS. 16 and 17 show in more detail how the system computes sample locations and inserts them into the Physical Grid 700 (these computations are step 1502 from FIG. 15). Most of the computation for step 1502 is performed by Graphics Processing Unit 1112. To prepare Graphics Processing Unit 1112 to perform this computation, CPU 1110 configures Fragment Processors 1206 to perform the steps described in FIG. 16 for each incoming fragment and Raster Operation Units 1210 to perform the operations described in FIG. 17 for each incoming fragment. The CPU 1110 initiates step 1502 by drawing an image-sized rectangle aligned with the depth-only eye-view image, in a manner familiar to those practiced in the art.

Figure 18:
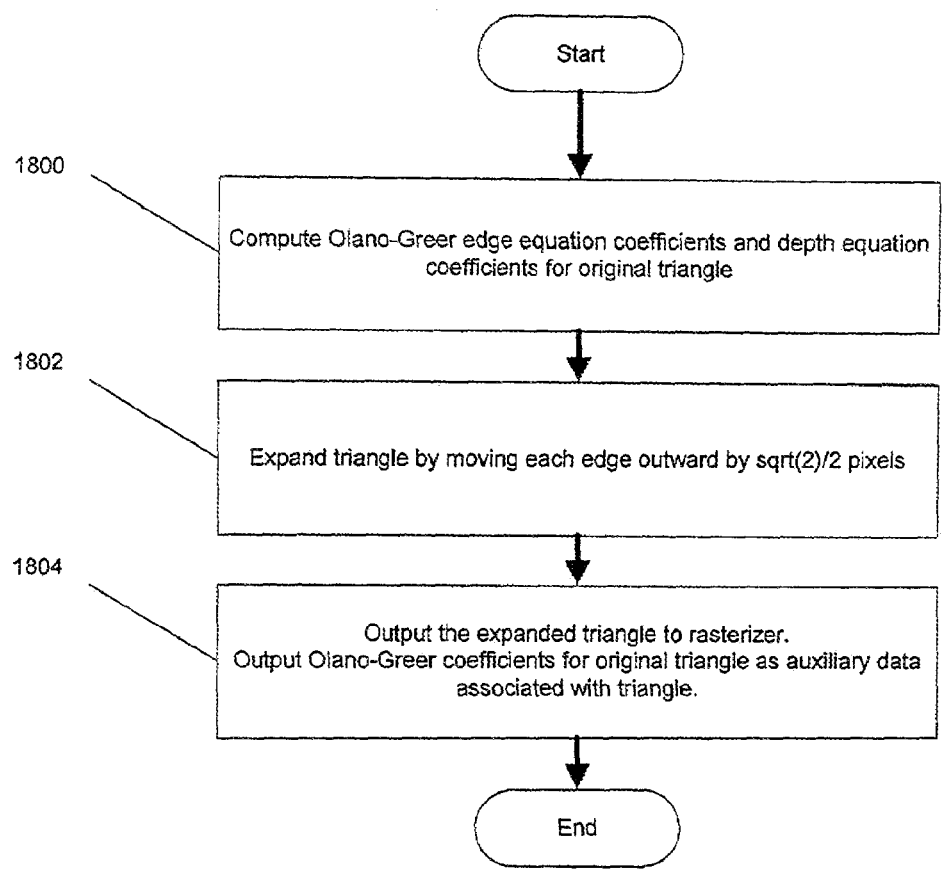
FIG. 18 is a flow chart illustrating the operation of the primitive processor of FIG. 12 during an irregular rasterization phase.
Figure 19:
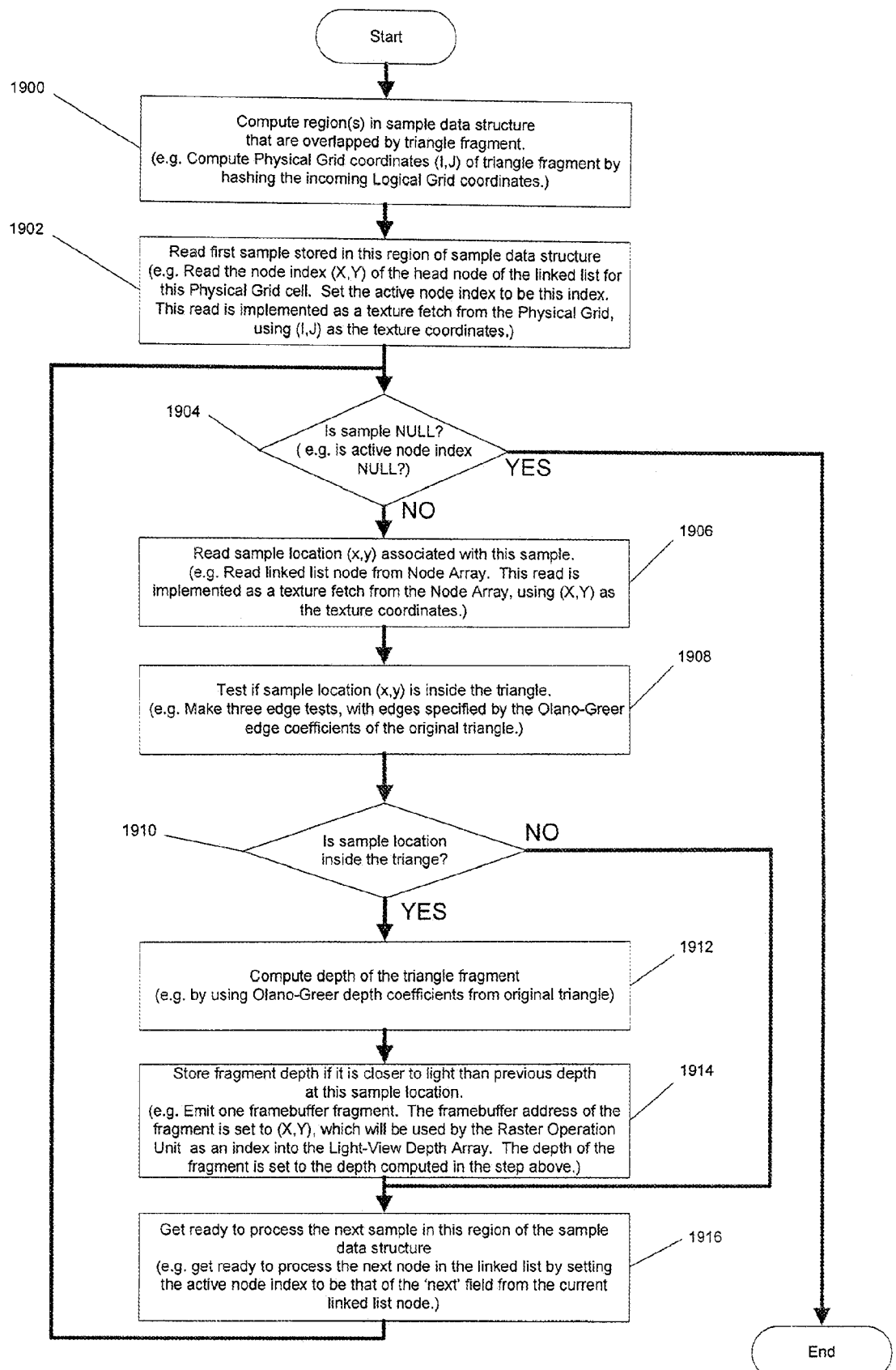
FIG. 19 is a flow chart illustrating the operation of the fragment processor during an irregular rasterization phase.

FIGS. 18 and 19 shows in more detail how the system generates the irregular depth-only shadow-map image (this is step 1504 from FIG. 15). FIG. 18 shows the steps performed for each primitive by Primitive Processor 1200. FIG. 19 shows the steps performed for each incoming fragment by Fragment Processor 1206.

Graphics Processor

The overall operation of the present invention is described in conjunction with FIG. 15. The description focuses on the main steps, steps 1502 and 1504. More specifically, these steps are respectively:

Construction Phase 1502: Compute all light-view sample locations and insert them into the sample-point data structure.

Irregular Rasterization Phase 1504: Generate a depth-only light-view shadow-map image using irregular rasterization. Sample locations are specified by the sample-point data structure.

During Irregular Rasterization Phase 1504, the CPU 1110 feeds geometric primitives describing the scene to the Graphics Processing Unit 1112, in the same manner that it does in systems based on the prior-art technique of shadow-map generation. This similarity in usage from the point of view of application programs is a major advantage of our technique as compared to the alternative techniques of ray tracing and shadow volumes.

Refer again to FIG. 12. The Graphics Processing Unit 1112 shown in detail in FIG. 12 provides efficient support for both the Construction Phase 1502 and the Irregular Rasterization Phase 1504. In some respects, the architecture is similar to that of prior-art Graphics Processing Units such as the NVIDIA GeForce 6800, and thus its general nature will be familiar to those skilled in the art even though it differs in some key respects. In an illustrative embodiment, Graphics Processing Unit 1112 has 16 Fragment Processors 1206; has 16 Raster Operation Units 1210; and has a 256-bit wide memory system. The memory system has four Memory Controllers 1214, each with two GDDR3 DRAMs 1216. The Graphics Processing Unit 1112 has six Primitive Processors 1200. The Graphics Processing Unit 1112 also has six Vertex Processors 1202. Other numbers of processors of each type may be used in the present invention. The Graphics Processing Unit 1112 further includes a memory network 1212, a primitive reassembly unit, a front end, a plurality of work distribution units, and a rasterizer and stencil test unit.

The following subsections describe the components of Graphics Processing Unit 1112 in greater detail and their roles in each of the two key computational phases 1502 and 1504 of the irregular Z-buffer as it is used for irregular shadow mapping.

Primitive Processor

Each Primitive Processor 1200 can access data for all three vertices of the triangle that it is processing at any particular point in time. The primitive processor 1200 is used during the Irregular Rasterization Phase 1504. FIG. 18 shows the steps executed by the primitive processor for each triangle that is rendered. In step 1800, the edge equations for the triangle are computed. In step 1802, the triangle is expanded by moving each edge outward in the direction of the edge normal by square root(2)/2 pixels. The purpose of this expansion is to cause the Rasterizer and Stencil Test Unit 1204 to generate a fragment for each logical grid cell that is overlapped by a triangle, even though the Rasterizer and Stencil Test Unit 1204 uses a traditional sample-at-pixel-centers technique. In step 1804, the primitive processor outputs both the expanded triangle and the edge equations for the unexpanded triangle. The edge equations may be the equations described in OLANO, M. AND GREER, T 1997. *Triangle scan conversion using 2D homogeneous coordinates. In Proceedings of the ACM SIGGRAPH/EUROGRAPHICS Workshop on Graphics Hardware. ACM Press,* 89-95.

Fragment Processor Overview

FIG. 13 shows the internal architecture of Fragment Processor 1206. The fragment processor comprises a Multi-threaded Processor Core 1318 and an LI texture cache 1320. The Fragment Processor Core 1318 supports a fragment program instruction set, such as the NV_fragment_program2 instruction set (see BROWN, P. AND WERNESS, E. 2004. GL_NV_fragment_program2 extension specification), which includes control-flow instructions. Additionally, the processor core supports instructions for logical shifts. Fragment Processors 1206 may be implemented with a Multiple Instruction, Multiple Data parallel architecture.

As compared to prior-art fragment processors, Fragment Processor 1206 has three major new capabilities. These are: the ability to generate an arbitrary number of output fragments from each input fragment, the ability to specify the frame buffer address to be written for each output fragment (e.g., pixel x/y), subject to certain constraints, and the ability to perform "min( )" and "max( )" associative reduction operations. Additionally, the fragment processor has access to the homogeneous equations that are computed by the primitive processor. These equations describe the edges and Z interpolation of the fragment's triangle.

Each fragment processor 1206 is multithreaded with zero cycle context switches and round-robin scheduling, allowing the processor to remain active even when most threads are waiting on cache misses. In an illustrative embodiment, there are 16 threads on each processor. Each processor 1206 may be simple—it issues one scalar or one 4-wide vector operation each cycle.

Fragment Processor Operation during Construction Phase 1502

FIG. 16 illustrates the role of the fragment processor in the Construction Phase 1502 of irregular shadow mapping. For each pair of Pixels 608 in the Eye-View Image 602, one of the plurality of Fragment Processors 1206 performs the operations shown in FIG. 16 twice (once for each pixel in the pair). The Rasterizer and Stencil Test Unit 1204 assigns each pair of Eye-View Image Pixels 608 to a particular Fragment Processor 1206 based on a static interleave pattern. Although it would be simpler to process one pixel at a time in each fragment processor, the system processes two pixels at a time in each fragment processor to maximize the use of the 4-wide vector operations available in the fragment processors. To improve clarity, the remainder of this description will describe the operations of the fragment processor as if it processed one pixel at a time.

Once the Eye-View Image Pixel 608 has been assigned to a Fragment Processor 1206, the Fragment Processor 1206 begins the work described in FIG. 16. First, the fragment processor reads the depth value of the pixel (step 1600). This depth value, in conjunction with the image-space (x,y) address of the pixel, is treated as a definition of a 3D point (606 Point Visible from Eye View). In Step 1602 the fragment processor transforms the coordinates for this 3D point into light space, then projects the resulting light-space point onto the shadow-map image plane 604 (which corresponds to Image Plane 801 in FIG. 8). In Step 1604 the processor truncates the continuous image plane coordinates (e.g., Sample Location 804) to form logical grid coordinates representing a particular logical grid cell (e.g., Logical Grid Cell #1, 814; Logical Grid Cell #2, 816). (FIG. 8 includes an illustration of the mapping from logical grid cell to physical grid cell produced by this hash function, shown as Mapping Produced by Hash Function 812.) Next, in Step 1606, the processor uses a hash function to map the logical grid cell to a physical grid cell (e.g., Physical Grid Cell #1, 818). The hash function used may be the following:

Define Lgrid_i as the x coordinate of the Logical Grid Cell.
Define Lgrid_j as the y coordinate of the Logical Grid Cell.
Define Pgrid_i as the x coordinate of the Physical Grid Cell (to be computed).
Define Pgrid_j as the y coordinate of the Physical Grid Cell (to be computed).
Pgrid_width is the number of cells in the X dimension of the Physical Grid.
Pgrid_height is the number of cells in the Y dimension of the Physical Grid.
Tile height is the height of a locality-preserving tile, measured in units of Logical Grid cells.
Tile width is the width of a locality-preserving tile, measured in units of Logical Grid cells.
Pgrid_i=(abs(Lgrid_i)+floor(Lgrid_j/Pgrid_width)*tile_width) mod Pgrid_width
Pgrid_j=(abs(Lgrid_j)+floor(Lgrid_i/Pgrid_height)*tile_height) mod Pgrid_height The values of Pgrid_width, Pgrid_height, tile_height, and tile_width are not critical for correctness and thus may be tuned to optimize performance for particular hardware and scene configurations. In one embodiment, Pgrid_width is 512, Pgrid_height is 512, Tile_width is 8 and Tile_height is 4.

Next, in Step 1607, the fragment processor updates registers that track four reduction-operation values—the minimum and maximum of logical grid x coordinate value and the minimum and maximum of logical grid y coordinate value. The values stored in these registers persist across fragments, and are retrieved from each Fragment Processor 1206 by CPU 1110 at the completion of Construction Phase 1502. At the completion of Construction Phase 1502 the CPU also performs a final reduction to obtain the overall min and max values, which the CPU uses at the start of Irregular Rasterization Phase 1504 to configure the Rasterizer and Stencil Test Unit 1204 for view port clipping.

Returning to the behavior in Fragment Processor 1206 during Construction Phase 1502, FIG. 16 shows that finally in Steps 1608, 1610, and 1612, the fragment processor writes the values it has computed into output data registers. These output data registers are sometimes referred to as "color output registers" in the prior art. One of these output data registers has special behavior and not present in the prior art, and is used to specify the fragment's (x,y) frame buffer position. The fragment processor writes the physical grid coordinates to this output register, which controls the routing of the fragment by the Fragment Network 1208 to a particular Raster Operation Unit 1210. The routing function used by Fragment Network 1208 is statically defined as a function of (x,y), in a manner similar to the static mapping by the rasterizer of (x,y) locations to particular Fragment Processors that is common in the prior art. Further processing of the fragment is then performed by the Raster Operation Unit 1210 as described later in the section headed "Raster Operation Unit Operation during Construction Phase 1502".

Raster Operation Unit Overview

FIG. 14 shows the internal architecture of Raster Operation Unit 1210. The Raster Operation Unit (ROP) performs atomic read-modify-write operations to memory. The ROP can be thought of as specialized multithreaded processor in which multiple read-modify-write transactions are in progress simultaneously. One aspect of the ROP design is its ability to preserve the atomic semantics of the read-modify-write operation. In this design, atomicity may be enforced per pixel (e.g., memory location). Thus, transactions to independent pixels may be arbitrarily intermingled. In this description ROP transactions are referred to as operating on pixels, but in the system the transactions may be performed on memory locations or a set of adjacent memory locations or a set of related memory locations even if they hold data other than pixel color or Z. Thus the ROP is in fact a flexible atomic read/modify/write unit.

The ROP unit in the present invention is more flexible than the ROP in prior art graphics processors. In particular, the ROP may generate writes to memory addresses other than the fragment's original frame buffer address.

The ROP may use a pixel-cache organization (see "*A Configurable Pixel Cache for Fast Image Generation*", Gorris et al. *IEEE Computer Graphics & Applications*, 1987). If desired, this second write address can be computed within the ROP from data read from the original frame buffer address. Generating new writes from previous data is used in the data structure construction phase of the irregular Z-buffer algorithm.

Next details of the ROP architecture are described. The Atomicity Enforcer 1422 insures that the ROP has no more than one transaction in progress for any particular pixel. This atomicity enforcer is similar to that described a prior-art patent (U.S. Pat. No. 6,734,861, *System, method and article of manufacture for an interlock module in a computer graphics processing pipeline*, Van Dyke et al.) The atomicity enforcer 1422 maintains a table indexed by a hash of the pixel address, indicating whether or not a fragment is in flight for a given hash. If a fragment is in flight, further fragments for that pixel are stalled (in order) in a queue until the offending fragment clears. Meanwhile, fragments for other pixels may continue to pass through the atomicity enforcer 1422 from the fragment network 1434. The Release Signal 1432 from a compute unit 1430 signals to the atomicity enforcer 1422 when all memory transactions related to a given pixel have completed, at which point it is safe to begin processing another fragment for the same pixel.

For each fragment, the Merge Buffer 1428 sends an address to the Left Pixel Cache 1424 and if needed to the Right Pixel Cache 1426. The two caches store data from disjoint address sets. For example, the left pixel cache can store color data while the right pixel cache stores Z values. Using two caches provides more bandwidth than a single cache, and allows cache behavior to be tuned separately for two data types. The Merge Buffer 1428 may contain an internal SRAM which holds fragments until they are ready to continue to the Compute Unit 1430. A fragment becomes ready to continue to the Compute Unit 1430 when all requested data has returned from the Left Pixel Cache 1424 and the Right Pixel Cache 1426. Thus, the purpose of the Merge Buffer 1428 is to merge the original incoming fragment data with the data read from the left and right pixel caches so that all needed data for the fragment is ready for the Compute Unit 1430.

The Compute Unit 1430 comprises a short pipeline that performs a set of simple configurable comparison and address-generation operations at a throughput of one fragment per cycle. It conditionally generates up to two pairs of data and addresses to be written, one pair each sent to the Left Pixel Cache 1424 and the Right Pixel Cache 1426. If the comparison within the Compute Unit 1430 fails, it may choose not to write any data to the caches. In this case, the Compute Unit 1430 immediately sends the fragment address over Release Signal 1432. If any data is written to the cache(s), the Compute Unit 1430 holds the fragment address in an internal buffer until it receives acknowledgement signals from all caches to which data was written. Once all such acknowledgement signals have been received, the compute unit sends the fragment address over Release Signal 1432 and removes the fragment from its internal buffer.

The Left Pixel Cache 1424 and Right Pixel Cache 1426 are both connected to Memory Network 1436 (or network 1212 of FIG. 12), which allows the caches to service cache misses by making requests to the memory system. Memory Network 1212 routes each memory request to the appropriate memory controller based on a simple interleaving pattern.

Raster Operation Unit Operation during Construction Phase 1502

FIG. 17 illustrates the operations performed by the Raster Operation Unit 1210 during Construction Phase 1502. Each sample point is inserted into the spatial data structure by pre-pending it to the linked list at a physical grid cell. The particular physical grid cell is specified by data carried with the incoming fragment. This incoming fragment was originally generated by the fragment processor as described earlier. Step 1700 is performed by the Atomicity Enforcer 1422, which locks the physical grid cell (specified as an (x,y) location). Step 1702 is performed by the Merge Buffer 1428. This step reads the head of the linked list from the Physical Grid cell via Left Pixel Cache 1424. The following four Steps (1704, 1706, 1708, and 1710) are performed by Compute Unit 1430. Compute Unit 1430 writes the address of the new linked-list node to the list-head, i.e. the particular physical grid cell mentioned earlier in this paragraph. This is Step 1704, and uses Left Pixel Cache 1434. The Compute Unit assembles the contents of the new linked list node, as described in Step 1708. The payload of the node is the x and y light-view coordinates of the sample. The 'next' field of the node is set to be the index of the old list head previously read in step 1702. This data is sent to Right Pixel Cache 1426, with the address defined by the eye-view image coordinates that have been carried with the fragment all the way from the fragment processor. This is step 1710. When the write-acknowledgements from both caches have been received, the Compute Unit 1430 sends the release signal (step 1706). At this point, processing of the fragment is complete.

Raster and Stencil Test Unit Operation during Irregular Rasterization Phase 1504

Refer again to FIG. 15. During Irregular Rasterization Phase 1504, the Raster and Stencil Test Unit receives expanded triangles originally generated by Primitive Processor 1200. For each triangle, the Raster and Stencil Test Unit generates a fragment for each logical grid cell whose center lies within the expanded triangle. However, if the stencil buffer entry corresponding to the logical grid cell is set to 0, the generation of the fragment is suppressed. Since correctness of the computation is not affected by this stencil buffer test, alternative embodiments may omit the stencil test as well as step 1503, but such omission is likely to reduce overall system performance.

Fragment Processor Operation during Irregular Rasterization Phase 1504

FIG. 19 shows the role of the Fragment Processors 1206 during the Irregular Rasterization Phase 1504 of irregular shadow mapping. For each fragment generated by the Raster and Stencil Test Unit 1204, one of the plurality of Fragment Processors 1206 performs the operations shown in FIG. 19. The Rasterizer and Stencil Test Unit 1204 assigns each fragment to a particular Fragment Processor 1206 based on a static interleave pattern.

Once the fragment has been assigned to a Fragment Processor 1206, the Fragment Processor 1206 begins the process described in FIG. 19. The steps described in FIG. 19 do the following: First, the fragment processor computes the physical grid coordinates of the fragment by applying a hash function to the Logical Grid Coordinates (step 1900). The Logical Grid Coordinates come from the fragment's screen space (x,y) position register. The hash function is the same one described earlier for step 1606. Next, the fragment processor traverses the linked list of samples associated with that physical grid cell. Each sample in the linked list is tested against the original edge equations of the triangle. If the sample is inside the triangle, the fragment processor evaluates the Z interpolation equation at the sample location and generates an output fragment. The output contains the eye-view (X,Y) index to the Sample Node 704 containing the sample. This (X,Y) index is treated as the destination frame buffer address for the fragment. The output also includes the computed Z value. The entire output packet is sent to one of the Raster Operation Units 1210 via Fragment Network 1208. The Fragment Network 1208 routes the fragment to a particular Raster Operation Unit 1210 using a static routing that is a function of the (X,Y) index.

It is useful to explain several steps in FIG. 19 in additional detail. The purpose of Step 1902 is to read the address of the first node in the linked list for the current fragment's physical grid cell. In this step, the physical grid coordinates (I, J) are used as texture indices to specify an array element (e.g. 706) in 2D array Physical Grid 700 which is stored as a texture in texture memory. The fragment processor executes a texture-read operation to read the specified array element from the texture. This array element contains a pair of values (X,Y) which together form a 2D index into Node Array 710. This index may be a NULL value, indicating that the 2D index is not valid and that the linked list is of length zero (step 1904).

The purpose of Step 1906 is to read a single node from the linked list. In this step, the 2D index (X,Y) into the Node Array 710 is used as a 2D texture coordinate. The fragment processor executes a texture-read operation to read the specified array element from the texture corresponding to Node Array 710. The data read from the texture includes the precise light-view image-plan coordinates of the sample, as (x,y). The data read from the texture also includes the 2D array index (X,Y) of the next node in the linked list. This index may be a NULL value, indicating that the 2D index is not valid and that the end of the linked list has been reached. The sample location (x,y) obtained from the linked list note is tested against all three edges of the triangle, using for example the Olano-Greer edge coefficients (step 1908). The process ends if the sample location is not inside all three edge equations (step 1910).

Otherwise the depth of the triangle fragment is computed (step 1912). One framebuffer fragment is emitted (step 1914). The framebuffer address of the fragment is set to (X,Y) which the Raster Operation Unit uses as an index into the Light-View Depth Array. The depth is set using the depth from step 1912. The active node index is set for the next field from the current linked list node (step 1916).

Raster Operation Unit Operation During Irregular Rasterization Phase 1504

In the Irregular Rasterization Phase 1504, the operation of the Raster Operation Unit 1210 is straightforward, since the unit performs a standard read/compare/conditional-write operation of the kind used for a conventional Z-buffer test. The read and write are made to Light-View Depth Array 906. Note that this array is a 2D array in memory, with the elements indexed by the eye-view (i,j) corresponding to the light-view sample point. The address for the read and write comes from the incoming fragment, and was originally determined by Fragment Processor 1206 as described earlier. The Merge Buffer 1428 issues the read, and the Compute Unit 1430 performs the comparison with the fragment's Z and conditionally performs the write. In this phase, the ROP uses both Left Pixel Cache 1424 and Right Pixel Cache 1426. Addresses are interleaved between the two caches, which provides higher performance than the more straightforward approach of using one of the caches.

Fragment Network

To improve the spatial and temporal reuse of cached data as well as to avoid cache coherence issues, pixel addresses are statically mapped to ROPs. Fragment Network 1208 routes fragments to the ROP that "owns" the address to which they are being written. The fragment network is an m×n network capable of buffering input from up to m fragment processors and routing output to up to n ROP units each cycle. This routing network is not present in prior art graphics processors, but is used by the dynamic nature of the data structures used in the system of FIG. 10.

Memory Layout of Data Structures

To improve cache performance, the data structures shown in FIG. 9 used a blocked layout in memory. The detailed implementation of this strategy is familiar to one skilled in the art.

Interface to Application Program

The graphics processing unit 1112 that as been described is capable of being configured such that race conditions and non-deterministic behavior occur. Such behavior does not occur in the final output when the architecture performs the operations described earlier in this specification, but it may occur in the intermediate steps, and it could occur in the final output if the architecture is configured in a different manner. In a graphics processor architecture it is useful to prohibit such configurations, to ensure compatibility across a product line as well as to ensure frame-to-frame consistency.

Thus, in one embodiment, the potentially non-deterministic capabilities of the graphics processing unit are not exposed directly. These potentially non-deterministic capabilities are the low-level ROP configuration and the ability of the fragment processor to specify the frame buffer address of output fragments. Instead, the construction phase and irregular rasterization phase are exposed as high-level capabilities via extensions to the software API (specifically OpenGL and DirectX). These high level capabilities block the application program from directly accessing the grid of linked lists data structure. Instead, this data structure is accessed via an opaque handle. The API allows this data structure to be created from an eye-view image via one API call, and allows this data structure to be used for irregular rasterization via a second API call.

Alternative Embodiments

Use Other Data Structures to Store Sample Locations

The embodiment described explicitly stores sample locations in a two-dimensional spatial data structure rather than implicitly representing them with a regular pattern. In this embodiment, the data structure is a grid of linked lists. However, the data structure may be any spatial data structure that supports efficient range queries, such as a k-d tree, BSP tree, quad tree or a simple grid.

In another embodiment, the data structure may be a data structure that places some restrictions on the configuration of sample locations that can be stored. In one specific alternative embodiment, the data structure is a grid of fixed-length lists or a grid of fixed-length arrays. During the construction phase, samples are discarded if they cannot be inserted into the data structure. In a second specific alternative embodiment, the grid data structure stores only one point per grid cell. This restricted approach still allows the location within the grid cell of this single sample point to be specified. Other alternative embodiments along these same lines will be obvious to one skilled in the art.

Store Data Structures in on-Chip Memory

An advantage of the present invention is that it produces artifact-free results with a strict bound on the amount of memory used for the data structures. This advantage permits an alternative embodiment in which some or all of the data structures described in FIG. 9 may be stored in on-chip memory rather than in off-chip memories 1216.

Line Segments Rather than Rays

Instead of intersecting rays with surface elements, line segments may be used to intersect with surface elements. Intersections beyond a certain distance along the ray may be ignored, or each ray may have an associated maximum distance stored with it in the data structure, with intersections beyond this distance ignored. As used herein, the term "ray" should be understood to include this case of line segments as well as similar modifications that would be obvious to one skilled in the art.

More specifically, an alternative embodiment for shadow computation is described. In FIG. 6, the line segment corresponding to Point Visible From Eye Point 606 is defined as the line segment between Light Viewpoint 612 and Point visible from eye viewpoint 606. For sample point 610, the system ignores any intersections that do not lie on this line segment. Additionally, the system ignores the intersection with the surface at point 606. That is, the line segment does not include the endpoint 606. Due to limited arithmetic precision, the ignoring of point 606 may be implemented using an epsilon offset, as is commonly done in prior-art ray tracing systems to prevent self-shadowing. In this embodiment, the system does not store the actual intersection points (if any) that are found between surface elements and the line segment. Instead, if it finds any such intersection, it sets a flag bit associated with the sample point 610 to indicate that an intersection point was found. Prior to the start of intersection testing, the flag bits associated with each sample point 610 are initialized to false. At the conclusion of the intersection testing, the flag bits for each sample point directly indicate whether or not the corresponding points 606 are in shadow. This embodiment has the advantage that only one bit of storage is needed for each sample point 610 during the irregular rasterization phase. Furthermore, this storage is write-only rather than read/write, eliminating the need to use a read/modify/write hardware unit for this phase of the computation. A further variant of this approach is to store these flag bits in on-chip memory rather than in off-chip memories 1216.

Points on Projection Surface Specified Directly

In one embodiment described above, the points on the projection surface are computed by computing the intersection between the rays and the projection surface. In an alternative embodiment, the points on the projection surface are directly specified by the application program or software device driver. The application program or device driver may also specify the projection surface and the center of projection. In this embodiment, the points on the projection surface implicitly represent the rays. This alternative embodiment may be desirable when points are a more natural representation than rays for the application program or software device driver.

Orthographic Projection

The center of projection 500 may be conceptually located at infinity, yielding an orthographic projection. The details of applying the system and method to an orthographic projection will be obvious to one skilled in the art.

Surface Elements Representing Boundaries of Volume Elements

The present invention may be used to compute intersections between rays and volume elements. In this alternative embodiment, the Surface Elements 511 represent boundaries of the volume elements.

Maintaining Fragment Order

Real-time rendering API's define precise ordering semantics for non-commutative operations such as blending and Z-buffered color writes. In some cases these semantics are directly useful to application programmers, but they may also guard against non-determinism from frame to frame or from one hardware generation to another.

Fortunately, order does not matter when using the irregular Z-buffer to generate shadow or other Z-only maps. In the construction phase of irregular shadow mapping the ordering of nodes in each linked list is unimportant and opaque to the user if the data structure is hidden behind a high-level API as explained previously. In the rasterization phase, fragment order is not visible to the user because the Z comparison and update operation is commutative so long as it does not carry auxiliary information with it, such as color.

However, the irregular Z-buffer can be used for different applications in which color is carried with Z (e.g. reflection map generation from reflective objects near a surface). For these applications, the preservation of fragment order during rasterization may matter.

Because the system routes fragments from the Raster and Stencil Test Unit to Fragment Processing Units based on the fragment's logical grid cell, the system ensures that the fragments generated by a fragment program will belong to a particular logical grid cell. Thus, in this alternative embodiment global fragment order is be maintained automatically by maintaining fragment order within each fragment processor. In more detail, this is accomplished by ensuring that fragments are retired from the fragment processor in the same order that they enter the fragment processor.

Other Graphics Processing Unit Architectures

One feature of the Graphics Processing Unit is that it may utilize a highly-parallel internal architecture to achieve high performance. Other parallel architectures may be used as a Graphics Processing Unit. One such alternative embodiment is described in *The Irregular Z-Buffer and its Application to Shadow Mapping*, Gregory S. Johnson, William R. Mark, and Christopher A. Burns, The University of Texas at Austin, Department of Computer Sciences Technical Report TR-04-09, Apr. 15, 2004, incorporated herein by reference. Another such alternative embodiment uses a chip-multi-processor architecture, such as the Sun Microsystem's Niagara architecture.

SIMD Fragment Processor Architecture

One feature of the Graphics Processing Unit is that it may utilize a Multiple Instruction Multiple Data architecture. With adjustments to the operations illustrated in FIG. 19, the graphics processor may utilize instead a Single Instruction Multiple Data architecture. Steps 1900 and 1902 are moved inside the loop, but are modified to be predicated. All fragment processors may then execute the steps in FIG. 19 in lockstep. A conditional input capability such as that used in the prior-art Stanford Imagine processor may be used to load the data for the next incoming fragment when the processing of the previous fragment is complete.

Construction Phase Performed on CPU

In another alternative embodiment, the construction phase of the technique is executed by a processor on a different semiconductor chip than the Graphics Processor. More specifically, the construction phase is performed by the CPU.

Removal of any-to-any Fragment-Network Routing in Irregular Rasterization Phase

In an alternative embodiment, the fragment network performing any-to-any routing during the irregular rasterization phase is eliminated. This is done by dynamically allocating storage for linked list nodes at new addresses, instead of storing linked list nodes at their eye-space index. The memory allocated to each node is chosen such that the node is stored in memory "owned" by the ROP just below the fragment processor which "owns" the node's logical grid cell. Thus, during the irregular rasterization phase, fragments always pass directly from a fragment processor to the ROP below that fragment processor. Memory allocation is performed separately for the region of memory "owned" by each ROP. Memory allocation may be performed by incrementing one or more counters associated with each ROP.

Additional Embodiments

Because one embodiment is described for shadow computations, some of the steps in the this embodiment combine operations specific to shadow computation with operations that would be used for any type of visibility computation that benefits from an irregular image-plane sample pattern such as that shown in FIG. 2. This situation is analogous to the manner in which prior-art shadow mapping techniques combine a few shadow-specific computations with the use of a conventional Z-buffer visibility technique.

Step 1502 is described in more detail in FIGS. 16 and 17. Within those figures, only sub-steps 1600 and 1602 are specific to shadow computations. Similarly, Step 1504 is described in more detail in FIGS. 18 and 19, for which none of the sub-steps are specific to shadow computations.

Other uses for the system and method of intersection testing include generation of reflection maps, adaptive sampling (e.g. for anti-aliasing), and limited forms of ray tracing as described in "*The Path-Buffer*"—*Cornell University Technical Report PCG*-95-4, Bruce Walter and Jed Lengyel.

In the foregoing description, various methods and apparatus, and specific embodiments are described. However, it should be obvious to one conversant in the art, various alternatives, modifications, and changes may be possible without departing from the spirit and the scope of the invention which is defined by the metes and bounds of the appended claims.

What is claimed is:

1. A method for determining in a computer system intersections between a plurality of light rays residing in three dimensional (3D) space and one or more surface elements residing in said 3D space, where said light rays or lines corresponding to said light rays share a common intersection point determined in connection with a light viewpoint, the method comprising:

determining 3D points visible from an eye viewpoint to provide a set of points on which subsequent shadow processing is performed;

processing intersection points irregularly arranged on a light projection surface with a center of projection at said light viewpoint comprising:

(i) for each 3D point visible from said eye viewpoint:
computing a two-dimensional location (2D) location of an intersection point of a light ray with said light projection surface by projecting said 3D point onto said light projection surface;
explicitly storing said two-dimensional (2D) location in a spatial data structure, in which 2D locations and not surface elements are stored, that supports efficient range queries for large numbers of points such that a distinct two-dimensional (2D) location is separately stored for each of said light rays, wherein an association is maintained between said two-dimensional (2D) location and said points visible from said eye viewpoint; and (ii) processing each of said surface elements subsequent to said explicit storage of said 2D locations, including performing range query processing including determining, using intersection testing, which of the intersection points irregularly arranged on the light projection surface and stored in said data structure are inside a two-dimensional (2D) region, determined using projection, that represents projection of said surface element onto said light projection surface, wherein intersection points determined to be inside said 2D region represent intersections between said surface element and the light rays corresponding to said irregularly arranged intersection points;

wherein stored 2D locations of irregularly arranged intersection points are used in the intersection testing, and wherein determination of whether or not a point is in shadow is performed as a function of the association maintained.

2. The method of claim 1, wherein said projection surface is a projection plane.

3. The method of claim 1, wherein said data structure is a 2D spatial data structure holding said intersection points as 2D points within said 2D spatial data structure.

4. The method of claim 3, wherein said intersection testing includes a 2D range query on said 2D spatial data structure.

5. The method of claim 3 wherein said 2D spatial data structure is a 2D BSP tree.

6. The method of claim 3 wherein said 2D spatial data structure is a 2D k-d tree.

7. The method of claim 3 wherein said 2D spatial data structure is a grid of lists.

8. The method of claim 7 wherein the grid of lists is stored in a memory and the memory size of the grid is reduced by using a hash function to access the grid cells.

9. The method of claim 3 wherein said 2D spatial data structure imposes limits on the density or spatial configuration of said 2D points, and the method further comprises discarding under specified circumstances some of said 2D points rather than storing said points in said 2D spatial data structure.

10. The method of claim 9 wherein said 2D spatial data structure comprises lists or arrays of bounded size.

11. The method of claim 9 wherein a point that is discarded may be either the most recent point to be considered for storage in the data structure, or a point that was previously stored in the data structure, and is evicted to make room for said most recent point.

12. The method of claim 3 wherein said intersection testing comprises:

rasterizing an expanded triangle to determine a set of grid cells within said 2D spatial data structure that said 2D region partially or fully overlaps;

accessing data associated with each said grid cell to determine a set of points that potentially lie within said 2D region;

testing each of said points against the edges of said 2D region to determine which points are inside said 2D region to thereby determine which points stored in said 2D spatial data structure are inside said 2D region.

13. The method of claim 1, wherein said surface elements are triangles.

14. The method of claim 1, wherein said 2D region is triangular.

15. The method of claim 1, further comprising:
determining a depth value for each of said rays, said depth value representing the depth of the closest of said surface elements to said center of projection that have already been processed and that intersect said ray, and
determining a front most point using said depth values.

16. The method of claim 1, further comprising:
determining a flag bit for each of said rays, said flag bit indicating whether any of said surface elements intersects the ray along a specified segment of the ray.

17. The method of claim 1 wherein said determining using projection evaluates only rays projecting to a certain finite area of the projection plane, the location of each said intersection point is constrained to be within said area of the projection plane.

18. The method of claim 1 wherein said surface elements comprise the boundaries of at least one volume element within said 3D space.

19. The method of claim 1 wherein the origins of said rays lie on a light source, and said determining using intersection testing includes determining the intersection of light rays with surfaces in a scene.

20. The method of claim 19 wherein said center of projection is a point light source.

21. The method of claim 20 further comprising selecting the directions of said rays so that the rays intersect points previously determined to be visible from an eye viewpoint.

22. The method of claim 1 wherein the origins of said rays lie on or near a reflective object within the scene, and the method further comprises computing a reflection map.

23. The method of claim 1 further comprising:
selecting said rays based on predetermined sampling density criteria; and
computing an adaptively sampled image.

24. The method of claim 1 further comprising:
performing said storage of said point into said data structure using an atomic read/modify/write; and
parallel processing the remainder of the computation that does not perform atomic read/modify/write.

25. A system for determining intersections between a plurality of light rays residing in 3D space and one or more surface elements residing in said 3D space, where said light rays or their corresponding lines share a common intersection point determined in connection with a light viewpoint, the system comprising:
a memory system for storing a data structure; and
a processor system, configured to process intersection points irregularly arranged on a projection surface, the processor system configured for:
determining 3D points visible from an eye viewpoint to provide a set of points on which subsequent shadow processing is performed;
processing intersection points irregularly arranged on a light projection surface with a center of projection at said light viewpoint comprising:
(i) for each 3D point visible from said eve viewpoint:
computing a two-dimensional location (2D) location of an intersection point of a light ray with said light projection surface by projecting said 3D point onto said light projection surface;
explicitly storing said two-dimensional (2D) location in a spatial data structure, in which 2D locations and not surface elements are stored, that supports efficient range queries for large numbers of points such that a distinct two-dimensional (2D) location is separately stored for each of said light rays, wherein an association is maintained between said two-dimensional (2D) location and said points visible from said eye viewpoint; and
(ii) processing each of said surface elements subsequent to said explicit storage of said 2D locations, including performing range query processing including determining, using intersection testing, which of the intersection points irregularly arranged on the light projection surface and stored in said data structure are inside a two-dimensional (2D) region, determined using projection, that represents projection of said surface element onto said light projection surface, wherein intersection points determined to be inside said 2D region represent intersections between said surface element and the light rays corresponding to said irregularly arranged intersection points;
wherein stored 2D locations of irregularly arranged intersection points are used in the intersection testing, and
wherein determination of whether or not a point is in shadow is performed as a function of the association maintained.

26. The system of claim 25 further comprising an interactive computer graphics display for displaying an image in response to said intersection points.

27. The system of claim 25, wherein said projection surface is a projection plane.

28. The system of claim 25, wherein said data structure is a 2D spatial data structure holding said intersection points as 2D points within said 2D spatial data structure.

29. The system of claim 28 wherein said 2D spatial data structure is a 2D BSP tree.

30. The system of claim 28 wherein said 2D spatial data structure is a 2D k-d tree.

31. The system of claim 28 wherein said 2D spatial data structure is a grid of lists.

32. The system of claim 31 wherein the size of the grid stored in memory is reduced by using a hash function to access the grid cells.

33. The system of claim 28 wherein said 2D spatial data structure imposes limits on the density or spatial configuration of said 2D points, and wherein the processor system discards under specified circumstances some of said 2D points rather than being stored in said 2D spatial data structure.

34. The system of claim 33 wherein said 2D spatial data structure comprises lists or arrays of bounded size.

35. The system of claim 34 wherein a point that is discarded may be either the most recent point to be considered for storage in the data structure, or a point that was previously stored in the data structure, and is evicted to make room for said most recent point.

36. The system of claim 28 wherein the processor system executes said intersection testing by rasterizing an expanded triangle to determine the set of grid cells within said 2D spatial data structure that said 2D region partially or fully overlaps, accessing data associated with each said grid cell to determine a set of points that potentially lie within said 2D region, testing each of said points against the edges of said 2D region to determine which points are inside said 2D region to thereby determine which points stored in said 2D spatial data structure are inside said 2D region.

37. The system of claim 25, wherein said processor system includes a graphics processor to perform said determining using projection and determining using intersection testing.

38. The system of claim 25, wherein said processor system includes a graphics processor to determine said intersection point for each of said rays.

39. The system of claim 25, wherein said surface elements are triangles.

40. The system of claim 25, wherein said 2D region is triangular.

41. The system of claim 25, wherein said processor system performs a 2D range query on said 2D spatial data structure as part of said determining using projection.

42. The system of claim 25, wherein for each of said rays said processor system determines and stores in said memory system a depth value that represents the depth of the closest of said surface elements to said center of projection that have already been processed and that intersect said ray and determines a front most point using said depth values.

43. The system of claim 25 wherein the processor system evaluates only rays projecting to a certain finite area of the projection plane, the location of each said intersection point is constrained to be within said area of the projection plane.

44. The system of claim 25 wherein said surface elements comprise the boundaries of one or more volume elements within said 3D space.

45. The system of claim 25 wherein the origins of said rays lie on a light source, and said processor system determines the intersection of light rays with surfaces in a scene using said points inside said 2D region.

46. The system of claim 45 wherein said center of projection is a point light source.

47. The system of claim 45 wherein the processor system selects the directions of said rays so that the rays intersect points which were previously determined to be visible from an eye viewpoint.

48. The system of claim 25 wherein the origins of said rays lie on or near a reflective object within the scene, and said processor system computes a reflection map using said origins.

49. The system of claim 25 wherein said processor system selects said rays so that regions of the image plane using a higher sampling density are sampled more densely than those using a lower sampling density and computes an adaptively sampled image using such image plane.

50. The system of claim 25 wherein said data structure is primarily constructed by a processor on a first semiconductor chip.

51. The system of claim 25 wherein said data structure is constructed by a processor system on a first semiconductor chip and intersection testing is performed by a processor system on a second semiconductor chip within the same computer system as said first semiconductor chip.

52. The system of claim 25 wherein overall operation is performed by a processor system on a first semiconductor chip and a data structure is constructed by and intersection testing is performed by a processor system on a second semiconductor chip within the same computer system as said first semiconductor chip.

53. The system of claim 25 further comprising at least one atomic read/modify/write unit within said processor system to perform said storage of said point into said data structure, and a plurality of processors for executing in parallel operations that are not atomic read/modify/write operations.

54. The system of claim 25 wherein the processor system executes an application program that invokes operations through an API that denies direct access to said data structure, wherein said application program cannot observe the specific nature of said data structure or any aspects of said data structure that are non-deterministic with respect to differences in hardware architecture of said system or execution timing.

55. A method for determining in a computer system intersections between irregularly arranged points explicitly stored in a data structure and one or more surface elements residing in a three dimensional (3D) space, said irregularly arranged points representing two-dimensional locations of intersection points of a plurality of rays residing in space with a projection surface in said 3D space, said rays or lines corresponding to said rays share a common intersection point, comprising:
  determining 3D points visible from an eye viewpoint to provide a set of points on which subsequent shadow processing is performed;
  processing intersection points irregularly arranged on a light projection surface with a center of projection at said light viewpoint comprising:
    (i) for each 3D point visible from said eye viewpoint:
      computing a two-dimensional location (2D) location of an intersection point of a light ray with said light projection surface by projecting said 3D point onto said light projection surface;
      explicitly storing said two-dimensional (2D) location in a spatial data structure, in which 2D locations and not surface elements are stored, that supports efficient range queries for large numbers of points such that a distinct two-dimensional (2D) location is separately stored for each of said light rays, wherein an association is maintained between said two-dimensional (2D) location and said points visible from said eye viewpoint; and
    (ii) processing each of said surface elements subsequent to said explicit storage of said 2D locations, including performing range query processing including determining, using intersection testing associated with said irregularly arranged points, which of the intersection points irregularly arranged on the light projection surface and stored in said data structure are inside a two-dimensional (2D) region, determined using projection, that represents projection of said surface element onto said light projection surface wherein intersection points determined to be inside said 2D region represent intersections between said surface element and the light rays corresponding to said irregularly arranged intersection points;
  wherein stored 2D locations of irregularly arranged intersection points are used in the intersection testing, and
  wherein determination of whether or not a point is in shadow is performed as a function of the association maintained.

56. A system for determining intersections between an explicitly stored plurality of points representing two-dimensional locations of irregularly arranged intersection points of a plurality of rays residing in space with a projection surface in a three dimensional (3D) space and one or more surface elements residing in said 3D space, where said rays or their corresponding lines share a common intersection point, comprising:

a memory system for storing a data structure including said plurality of points representing two-dimensional locations of irregularly arranged intersection points of said plurality of rays; and a processor system for determining for each of said surface elements using projection a two-dimensional (2D) region representing the projection of said surface element onto said projection surface, the processor system configured for:

determining 3D points visible from an eye viewpoint to provide a set of points on which subsequent shadow processing is performed;

processing intersection points irregularly arranged on a light projection surface with a center of projection at said light viewpoint comprising:

(i) for each 3D point visible from said eye viewpoint:
computing a two-dimensional location (2D) location of an intersection point of a light ray with said light projection surface by projecting said 3D point onto said light projection surface;
explicitly storing said two-dimensional (2D) location in a spatial data structure, in which 2D locations and not surface elements are stored, that supports efficient range queries for large numbers of points such that a distinct two-dimensional (2D) location is separately stored for each of said light rays, wherein an association is maintained between said two-dimensional (2D) location and said points visible from said eye viewpoint; and (ii) processing each of said surface elements subsequent to said explicit storage of said 2D locations, including performing range query processing including determining, using intersection testing, which of the intersection points irregularly arranged on the light projection surface and stored in said data structure are inside a two-dimensional (2D) region, determined using projection, that represents projection of said surface element onto said light projection surface wherein intersection points determined to be inside said 2D region represent intersections between said surface element and the light rays corresponding to said irregularly arranged intersection points;

wherein stored 2D locations of irregularly arranged intersection points are used in the intersection testing, and wherein determination of whether or not a point is in shadow is performed as a function of the association maintained.

57. The system of claim 56, wherein said processor system performs a 2D range query on said 2D spatial data structure as part of said determining using projection.

58. The system of claim 56 wherein said 2D spatial data structure comprises lists or arrays of bounded size.

* * * * *